US009788047B2

(12) United States Patent
Roberts et al.

(10) Patent No.: US 9,788,047 B2
(45) Date of Patent: Oct. 10, 2017

(54) MEDIA GUIDE USER INTERFACE SYSTEMS AND METHODS

(71) Applicant: Verizon Patent and Licensing Inc., Arlington, VA (US)

(72) Inventors: Brian F. Roberts, Dallas, TX (US); George M. Higa, Plano, TX (US); Anthony Lemus, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/675,568

(22) Filed: Mar. 31, 2015

(65) Prior Publication Data
US 2016/0127791 A1 May 5, 2016

Related U.S. Application Data

(60) Provisional application No. 62/072,863, filed on Oct. 30, 2014.

(51) Int. Cl.
*H04N 5/445* (2011.01)
*H04N 21/431* (2011.01)
(Continued)

(52) U.S. Cl.
CPC ....... *H04N 21/4312* (2013.01); *G06F 3/0482* (2013.01); *H04N 21/252* (2013.01); *H04N 21/25891* (2013.01); *H04N 21/4316* (2013.01); *H04N 21/44218* (2013.01); *H04N 21/44222* (2013.01); *H04N 21/4532* (2013.01); *H04N 21/4586* (2013.01); *H04N 21/4622* (2013.01); *H04N 21/4661* (2013.01); *H04N 21/4667* (2013.01); *H04N 21/472* (2013.01); *H04N 21/4725* (2013.01); *H04N 21/4755* (2013.01); *H04N 21/4788* (2013.01);
(Continued)

(58) Field of Classification Search
CPC .. H04N 21/431; H04N 21/462; H04N 21/482; H04N 21/4821; H04N 21/4823; H04N 21/4828
See application file for complete search history.

(56) References Cited

U.S. PATENT DOCUMENTS 5,589,892 A * 12/1996 Knee ................ A63F 13/12
348/564
7,703,116 B1 * 4/2010 Moreau ............. G06F 3/0482
725/44
(Continued)

*Primary Examiner* — John Schnurr

(57) ABSTRACT

Exemplary systems and methods provide a media guide graphical user interface having distinct views dedicated to presenting different sets of information about media content distributed by way of a media service, such as a first view dedicated to presenting information about media programs scheduled for distribution by way of a media service during one or more time slots that overlap a current time and a second view dedicated to presenting information about media programs scheduled for distribution by way of the media service during one or more time slots that are temporally subsequent to the one or more time slots that overlap the current time. In certain examples, a requested view of the media guide graphical user interface is dynamically populated with a select set of categories and category-specific media programs based on one or more predefined selection factors.

20 Claims, 16 Drawing Sheets

(51) Int. Cl.
*H04N 21/45* (2011.01)
*H04N 21/466* (2011.01)
*H04N 21/442* (2011.01)
*H04N 21/462* (2011.01)
*H04N 21/4725* (2011.01)
*H04N 21/475* (2011.01)
*H04N 21/482* (2011.01)
*H04N 21/81* (2011.01)
*G06F 3/0482* (2013.01)
*H04N 21/472* (2011.01)
*H04N 21/4788* (2011.01)
*H04N 21/458* (2011.01)
*H04N 21/25* (2011.01)
*H04N 21/258* (2011.01)
*H04N 21/658* (2011.01)

(52) U.S. Cl.
CPC . *H04N 21/47202* (2013.01); *H04N 21/47205* (2013.01); *H04N 21/4821* (2013.01); *H04N 21/4825* (2013.01); *H04N 21/4826* (2013.01); *H04N 21/6582* (2013.01); *H04N 21/8133* (2013.01)

(56) References Cited

U.S. PATENT DOCUMENTS

| | | | |
|---|---|---|---|
| 8,250,614 B1* | 8/2012 | Ellis | H04N 21/4334 725/100 |
| 2006/0026635 A1* | 2/2006 | Potrebic | H04N 5/44582 725/37 |
| 2008/0060009 A1* | 3/2008 | Kelts | G06F 3/0481 725/39 |
| 2008/0120650 A1* | 5/2008 | Orihara | H04N 5/44543 725/45 |
| 2009/0077590 A1* | 3/2009 | Nielen | H04N 5/44543 725/47 |
| 2011/0078738 A1* | 3/2011 | Papaspyropoulos | H04N 21/4312 725/40 |
| 2011/0239253 A1* | 9/2011 | West | H04N 21/23436 725/46 |
| 2014/0130096 A1* | 5/2014 | Krishnamurthy | H04N 21/4122 725/46 |
| 2015/0195621 A1* | 7/2015 | Harron | H04N 21/4668 725/46 |

\* cited by examiner

MEDIA GUIDE USER INTERFACE SYSTEMS AND METHODS

RELATED APPLICATIONS

The present application claims priority under 35 U.S.C. §119(e) to U.S. Provisional Patent Application No. 62/072,863, filed Oct. 30, 2014. The contents of the provisional patent application are hereby incorporated by reference in their entirety.

BACKGROUND INFORMATION

A provider of a media distribution service typically provides a user of the service with a user interface through which the user is able to discover and access media programs that are distributed by way of the media distribution service. For example, a provider of a television service through which television programs are distributed on television channels in accordance with a distribution schedule typically provides an interactive program guide for use by a user of the service to discover and access the television programs.

A conventional interactive program guide for a television service includes a two-dimensional matrix of television program cells arranged relative to a vertical channel axis and a horizontal time axis. A position of a cell relative to the channel axis and the time axis indicates the channel on which the television program is distributed and the time at which the television program is scheduled for distribution. A user may provide input to navigate along the channel axis and/or the time axis to select a particular cell in order to access a television program represented by the cell. While such a conventional interactive program guide has helped users discover and access television programs distributed by way of a television service, there remains room to improve interactive program guides and other media guide user interfaces to make the discovery and/or accessing of television programs or other media programs more convenient, meaningful, and/or efficient for a user of a media distribution service.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary media guide user interface systems and methods are described herein. The systems and methods may provide a media guide user interface for use by a user of a media service to discover and/or access media content such as one or more media programs distributed by way of the media service. As described herein, the media guide user interface may include user interface content and/or features configured to facilitate convenient, meaningful, and/or efficient discovery and accessing of media content by the user of the media service. Additional or alternative benefits that may be provided by one or more of the exemplary systems and methods described herein will be made apparent herein. Exemplary systems and methods will now be described in reference to the drawings.

Figure 1:
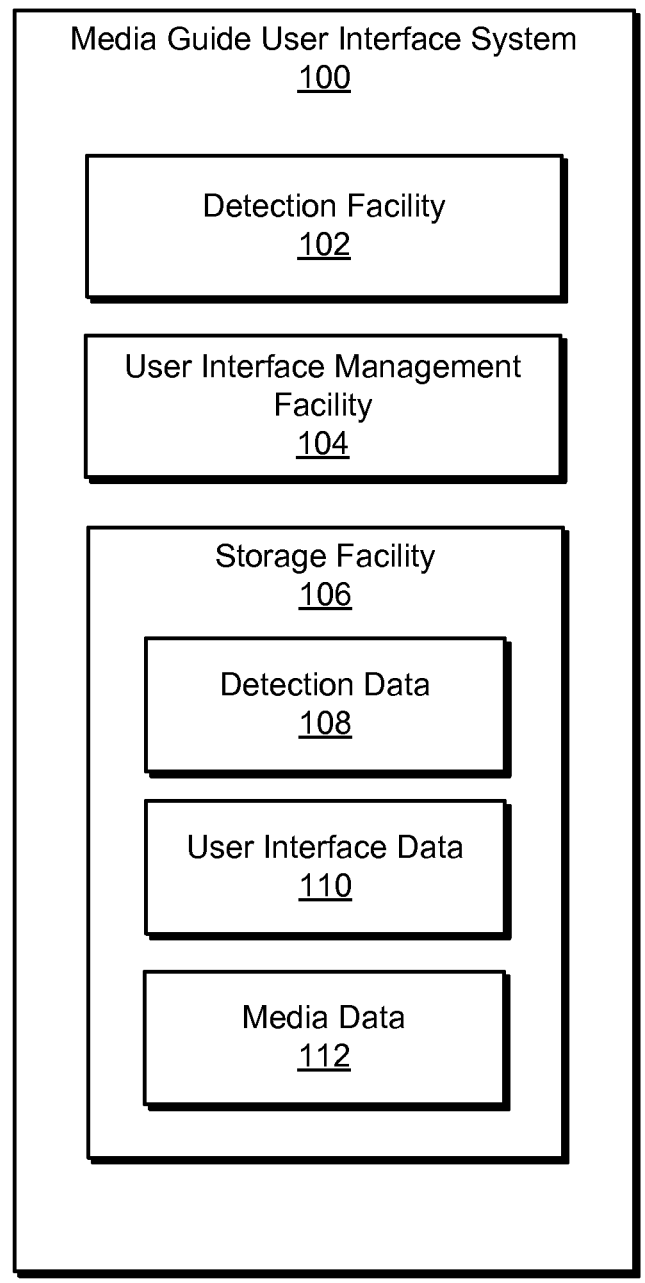
FIG. 1 illustrates an exemplary media guide user interface system according to principles described herein.

FIG. 1 illustrates an exemplary media guide user interface system 100 ("system 100") configured to provide a media guide user interface for use by a user of a media service to discover and access media programs distributed by way of the media service. As shown, system 100 may include, without limitation, a detection facility 102, a user interface management facility 104 ("management facility 104"), and a storage facility 106 selectively and communicatively coupled to one another. Any suitable communication technologies, including any of the communication technologies mentioned herein, may be employed to facilitate communications between facilities 102-106.

Although facilities 102-106 are shown to be discrete facilities in FIG. 1, any of facilities 102-106 may be combined into fewer facilities, such as into a single facility, or divided into more facilities as may serve a particular implementation. Additionally or alternatively, one or more of the facilities 102-106 may be omitted from and external to system 100 in other implementations. For example, storage facility 106 may be external of and communicatively coupled to system 100 in certain alternative implementations.

Facilities 102-106 of system 100 may include or be otherwise implemented by one or more physical computing devices specifically configured to perform one or more of the operations described herein. In such implementations, system 100 may be referred to as a computer-implemented system 100.

Storage facility 106 may store detection data 108, user interface data 110, and media data 112. Detection data 108 may include data generated and/or used by detection facility 102, such as data representative of a request for a media guide user interface. User interface data 110 may include data used and/or generated by management facility 104, such as data representative of a media guide user interface and/or user interface content. Media data 112 may include data representative of media content and/or information about media content. For example, media data 112 may include media guide data about media programs distributed by way of the media service. Storage facility 106 may maintain additional or alternative data as may serve a particular implementation.

Detection facility 102 may detect an occurrence of an event predefined to trigger performance of one or more operations by management facility 104. For example, detection facility 102 may detect a request for a media guide user interface and/or a particular view of the media guide user interface. Such a request may be for a presentation of the media guide user interface and/or the particular view of the media guide user interface to the user of the media service or for an update of the media guide user interface and/or the particular view of the media guide user interface currently being presented to the user of the media service. Examples of requests for a media guide user interface and/or a particular view of the media guide user interface are described herein.

Management facility 104 may provide a media guide user interface through which the user of the media service may interact with the media service to discover and/or access media programs distributed by way of the media service. In certain examples, the media guide user interface may include a media guide graphical user interface ("GUI") and/or one or more views of the media guide GUI that may be provided by management facility 104 for display on a display screen of a display device. Examples of a media guide GUI, including particular media guide GUI views, are described herein.

Figure 2:
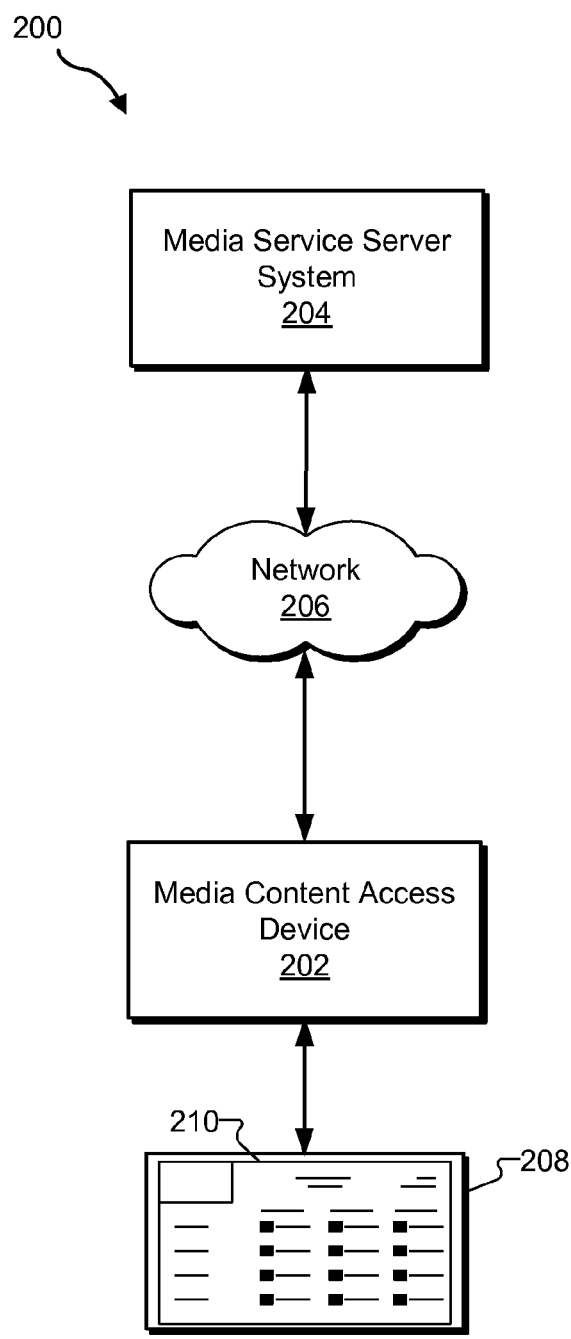
FIG. 2 illustrates an exemplary implementation of the system of FIG. 1 according to principles described herein.

FIG. 2 illustrates an exemplary implementation 200 of system 100. As shown, implementation 200 may include a media content access device 202 communicatively coupled to a media service server system 204 ("server system 204") by way of a network 206. Implementation 200 may also include a display screen 208 in communication with media content access device 202.

In implementation 200, one or more of facilities 102-106 of system 100 may be implemented entirely by media content access device 202, entirely by server system 204, or distributed across media content access device 202, server system 204, and/or display screen 208 in any manner. System 100 may alternatively be at least partially implemented by one or more computing devices or systems separate from media content access device 202 and server system 204. For example, system 100 may be at least partially implemented by a computing system maintained by a third-party entity other than a media service provider associated with server system 204.

Server system 204 and media content access device 202 may communicate using any communication platforms and technologies suitable for transporting data (e.g., media guide and/or media program data) and/or communication signals, including any of the communication technologies, including known communication technologies, devices, media, and protocols supportive of remote communications, examples of which include, but are not limited to, data transmission media, communications devices, Internet Protocol ("IP"), Transmission Control Protocol ("TCP"), User Datagram Protocol ("UDP"), Hypertext Transfer Protocol ("HTTP"), Hypertext Transfer Protocol Secure ("HTTPS"), Real-Time Transport Protocol ("RTP"), Session Initiation Protocol ("SIP"), Simple Object Access Protocol ("SOAP"), Extensible Mark-up Language ("XML") and variations thereof, radio frequency ("RF") signaling technologies, Code Division Multiple Access ("CDMA") technologies, Global System for Mobile Communications ("GSM") technologies, Time Division Multiple Access ("TDMA") technologies, Short Message Service ("SMS"), Multimedia Message Service ("MMS"), wireless communication technologies, Internet communication technologies, media streaming technologies, media download technologies, and other suitable communications technologies.

In certain embodiments, media content access device 202 and server system 204 may communicate via network 206. Network 206 may include, but is not limited to, one or more wireless networks (Wi-Fi networks), wireless communication networks, mobile telephone networks (e.g., cellular telephone networks), mobile phone data networks, broadband networks, narrowband networks, closed media networks, open media networks, wide area networks (e.g., the Internet), subscriber television networks, local area networks, live television transmission networks, media distribution networks, and any other networks capable of carrying media content, data (e.g., media guide data), and/or communications signals between media content access device 202 and server system 204. Communications between media content access device 202 and server system 204 may be transported using any one of the above-listed networks, or any combination or sub-combination of the above-listed networks. Alternatively, media content access device 202 and server system 204 may communicate in another way such as by one or more direct connections between media content access device 202 and server system 204.

Server system 204 may include one or more server-side computing devices. In certain examples, server system 204 may distribute media programs to media content access device 202 for access and use by media content access device 202 to present the media programs for consumption by a user of a media service. Server system 204 may distribute media programs to media content access device 202 as part of the media service and using any suitable media transmission technologies (e.g., media broadcasting, multicasting, narrowcasting, streaming, and/or downloading technologies). The media service may include a television content distribution service (e.g., a subscription television service), a service that distributes media content in accordance with a predefined distribution schedule, and/or any other suitable type of media distribution service as may serve a particular implementation.

Media content access device 202 may include a media content processing device (e.g., a set-top-box device, a DVR device, a television, a gaming console, a personal media player, a media server, a home media network gateway device, a tablet computer, a smartphone device, a mobile device, etc.) capable of accessing and providing media guide data and/or media programs distributed by server system 204 for presentation to and experiencing by an end user of the media service.

Media content access device 202 may be used by the end user of the media service to access and interact with the media service. For example, the user may utilize the media content access device 202 to access one or more user interfaces (e.g., a media guide user interface) provided by server system 204 and/or media content access device 202 as part of the media service, and to present the user interfaces for use by the user to discover, access, and/or consume media programs distributed by server system 204 as part of the media service.

In some examples, media content access device 202 may present media programs and one or more user interfaces associated with the media service by way of display screen 208. Display screen 208 may include a television, display monitor, and/or any other device separate from media content access device 202, as shown in FIG. 2. Alternatively, display screen 208 may be integrated into media content access device 202. For example, display screen 208 may include a display screen integrated into a tablet computer or smart phone device.

Management facility 104 may provide a media guide GUI 210 for display on display screen 208. The displayed media guide GUI 210 may include any particular view of the media guide GUI 210, including any of the exemplary media guide GUI views described herein.

Exemplary media guide GUI views and content and features thereof will now be described. The examples are illustrative only. A media guide user interface provided by management facility 104 may include additional or alternative media guide GUI views, content, and/or features as may suit a particular implementation.

Figure 3:
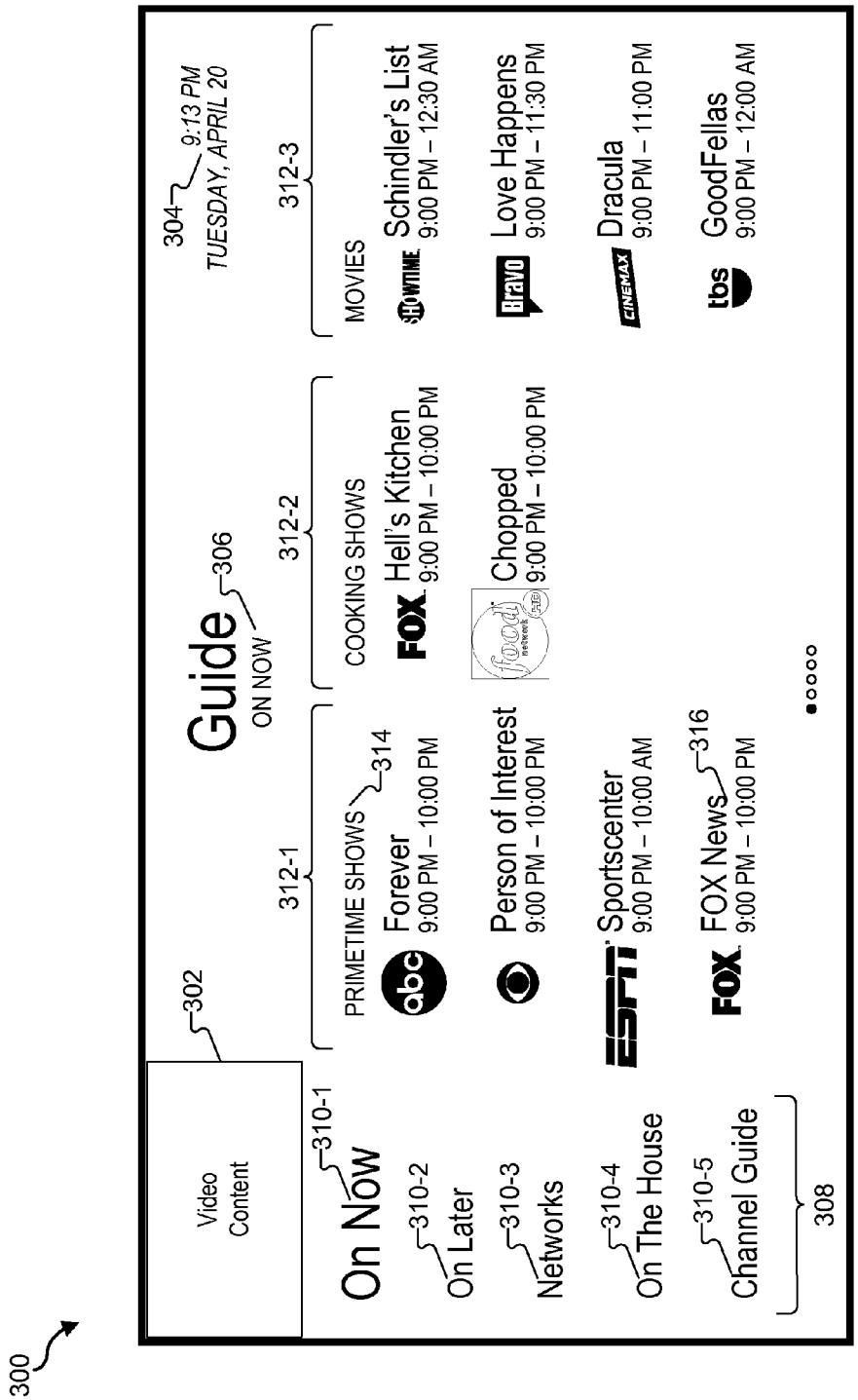
FIG. 3 illustrates an exemplary media guide graphical user interface view according to principles described herein.

FIG. 3 illustrates an exemplary media guide GUI view 300 ("view 300") that may be provided by management facility 104 for display on a display screen. View 300 may include user interface content such as header content in a header area of view 300, menu content along a left edge of view 300, and media program listings content in a primary display area of view 300 as shown in FIG. 3.

Header content in view 300 may include a video window 302 in which video content is presented (e.g., played back). Any selected video content may be presented in video window 302, such as video content distributed on a currently-selected media channel (e.g., a currently-selected television channel). Video window 302 may be located at an upper left corner of view 300 as shown or in any other suitable location in a header area of view 300 or elsewhere in view 300. Header content may also include time and date information 304 indicating a current time of day and a current date.

Header content in view 300 may further include information about view 300, such as an indicator 306 indicating a type of view being displayed. In the illustrated example, indicator 306 indicates that view 300 is an "on now" view of a media guide GUI. As described herein, an "on now" view of the media guide GUI may be dedicated (e.g., exclusively) to presenting information about media programs scheduled for distribution by way of the media service during one or more time slots that overlap a current time. As shown, each of the media programs represented in view 300 is scheduled for distribution during a 9:00 PM-10:00 PM time slot that overlaps the current time of 9:13 PM.

Menu content in view 300 may include a menu 308 of selectable menu options 310 (e.g., menu options 310-1 through 310-5). In view 300, menu options 310 are arranged in a vertical list to form menu 308 along a left edge of view 300. This is illustrative only. Menu options 310 may be arranged and/or positioned differently in view 300 in other examples.

Menu options 310 may be mapped to and may represent respective media guide GUI views. Based on the mappings between menu options 310 and respective media guide GUI views, detection facility 102 may detect a selection (e.g., a user selection or a system selection such as a default selection) of a particular menu option 310 as a request for the media guide GUI view mapped to the menu option 310, and in response to the detection, management facility 104 may provide the requested media guide GUI view for display on the display screen.

Menu option 310-1, which may be referred to as "on now" option 310-1, may be mapped to and represent an "on now" view dedicated to presenting information about media programs scheduled for distribution by way of the media service during one or more time slots that overlap the current time. View 300 is an example of an "on now" view.

Menu option 310-2, which may be referred to as "on later" option 310-2, may be mapped to and represent an "on later" view dedicated to presenting information about media programs scheduled for distribution by way of the media service during one or more time slots that are temporally subsequent to (i.e., future in time of) the one or more time slots that overlap the current time. An example of an "on later" view is described herein.

Menu option 310-3, which may be referred to as "networks" option 310-3, may be mapped to and represent a "networks" view dedicated to presenting information about portals for providers (e.g., portals for networks or other creators or licensees) of media programs distributed by way of the media service. An example of a "networks" view is described herein.

Menu option 310-4, which may be referred to as "on-the-house" option 310-4, may be mapped to and represent an "on-the-house" view dedicated to presenting information about media programs that are being offered for free access by the user of the media service as part of a service subscription or as part of a promotion. As an example, the "on-the-house" view may present information about on-demand media programs that are offered free of charge to the user as part of a subscription of the user to the media service. As another example, the "on-the-house" view may present information about media programs that are normally accessible by the user through the media service for a transactional price but that are currently being offered free of charge to the user as part of a promotion.

Menu option 310-5, which may be referred to as "channel guide" option 310-5, may be mapped to and represent a "channel guide" view dedicated to presenting information about media programs within a matrix of media program cells arranged relative to a vertical channel axis and a horizontal time axis, such as is known. Menu option 310-5 may provide the user with access to a familiar legacy-type channel guide view.

In view 300, menu option 310-1 is highlighted, as indicated by the "on now" text being larger in size than the text for the other menu options 310. In response to a selection of menu option 310-1, management facility 104 may provide an "on now" type view in the form of view 300 for display.

As mentioned, view 300 may be an "on now" type of view that is dedicated (e.g., exclusively) to presenting information about media programs scheduled for distribution by way of the media service during one or more time slots that overlap the current time. As shown, for example, view 300 includes media program listings content that represents only media programs that are scheduled for distribution during one or more time slots (e.g., the 9:00 PM-10:00 PM time slot) that overlap the current time (e.g., 9:13 PM).

In view 300, media program listings content is arranged to represent media programs by media category, which may be any categorization of media programs based on one or more attributes of the media programs. As shown, for example, view 300 may include media categories arranged as a row of media category columns 312 (e.g., media category columns 312-1 through 312-3). In the illustrated example, media category column 312-1, which is labeled "primetime shows," is dedicated to representing media programs scheduled to be distributed during primetime on major media channels, media category column 312-2, which is labeled "cooking shows," is dedicated to representing media programs related to the topic of cooking, and media category column 312-3, which is labeled "movies," is dedicated to representing media programs that are movies.

Each media category column 312 may include a media category indicator. For example, media category column 312-1 includes a media category indicator 314 in the form of text indicating the media category represented by media category column 312-1.

Each media category column 312 may include a vertically-arranged list of entries representing media programs of the media category represented by the respective media category column 312. For example, media category column 312-1 includes a list of entries representing primetime media programs. An entry may represent an individual media program and may include any suitable information about the media program, such as a media channel indicator (e.g., a channel or provider logo) indicating the media channel on which the media program is distributed, a title of the media program, and a time slot during which the media program is scheduled to be distributed. For example, entry 316 in media category column 312-1 represents a media program titled "FOX News" and scheduled for distribution during the 9:00 PM-10:00 PM time slot on a FOX media channel.

Management facility 104 may populate a media guide GUI view such as view 300 with media program listings content that represents media categories and media programs that are meaningful and/or of interest to the user. To this end, management facility 104 may select certain media categories and media programs for inclusion in a media guide GUI view. The selection, which may be performed dynamically in any suitable way based on a set of predefined selection factors, may include management facility 104 pre-selecting media categories by identifying certain media categories and prioritizing the media categories relative to one another for display arrangement in the media guide GUI view and selecting media programs by identifying media programs for inclusion in the selected media categories and prioritizing the selected media programs relative to one another within each media category for display arrangement in the media guide GUI view. In this or a similar manner, management facility 104 may abstract (e.g., on top of a media channel lineup and broadcast schedule) select media programs into media category groupings for meaningful and/or personalized presentation to the user in a media guide GUI view.

Figure 4:
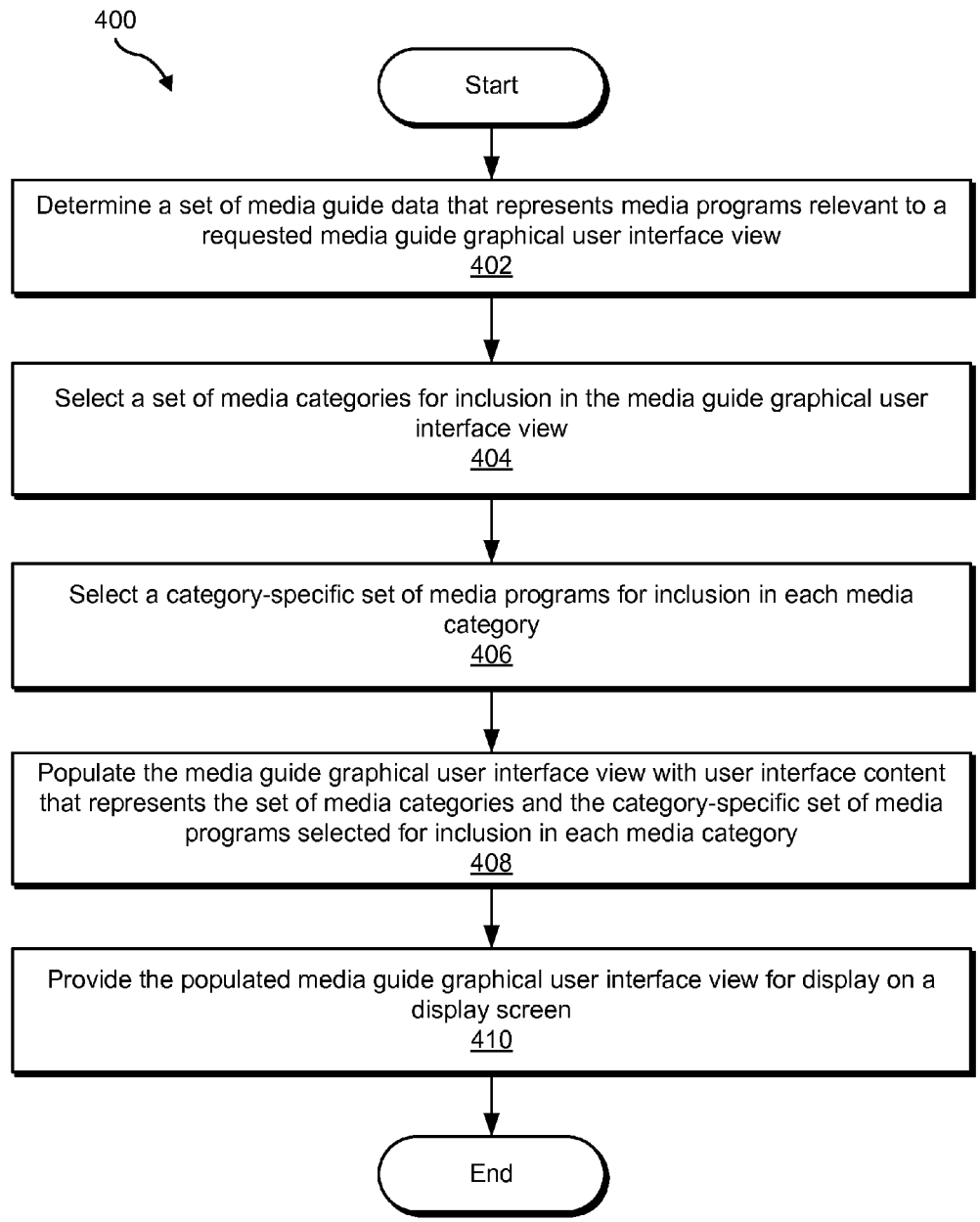
FIG. 4 illustrates an exemplary media guide user interface method according to principles described herein.

FIG. 4 illustrates an exemplary method 400 of providing a media guide GUI view. While FIG. 4 illustrates an exemplary method according to certain embodiments, other embodiments may omit, add to, reorder, combine, and/or modify any of the steps shown in FIG. 4. In certain embodiments, one or more steps shown in FIG. 4 may be performed by system 100 and/or one or more components or implementations of system 100, such as management facility 104, media content access device 202, and/or media service server system 204. In certain examples, one or more steps of method 400 may be performed in response to a detection, by detection facility 102, of a request for a media guide GUI view.

In step 402, management facility 104 determines a set of media guide data that represents media programs that are relevant to a requested media guide GUI view. The relevancy of media programs to the media guide GUI view may be based on the type of the media guide GUI view and whether the media programs have attributes fitting the type of the media guide GUI view. As an example, if the media guide GUI view is an "on now" view, relevant media programs are media programs that are "on now," i.e., media programs scheduled for distribution during one or more time slots that overlap the current time.

Figure 5:
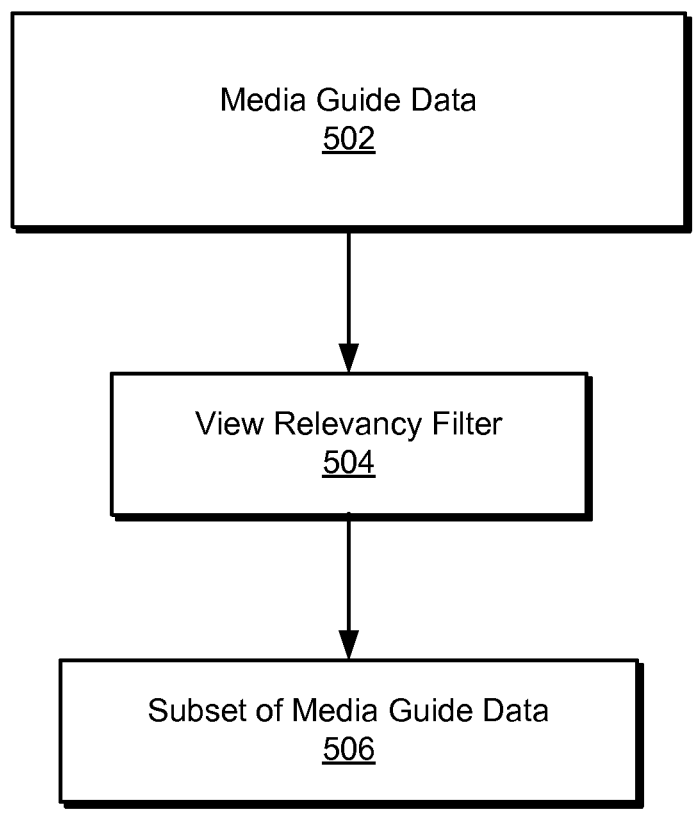
FIG. 5 illustrates an exemplary selection of a set of media guide data according to principles described herein.

The set of media guide data selected in step 402 may be a subset of an overall set of media guide data. FIG. 5 illustrates such an example in which media guide data 502 is an overall set of media guide data for the media service. That is, media guide data 502 may represent information (e.g., metadata and/or rich metadata) about all of the media programs that are available through the media service.

In step 402 of method 400, management facility 104 may apply a view relevancy filter 504 to media guide data 502 to determine a subset of media guide data 506. The subset of media guide data 506 may be a subset of the overall set of media guide data 502, the subset including information only about media programs having attributes that satisfy the view relevancy filter 504. For example, if the media guide GUI view is an "on now" view, application of the view relevancy filter 504 may generate a subset of media guide data 506 that includes information only for media programs scheduled for distribution during one or more time slots that overlap the current time.

Returning to FIG. 4, in step 404, management facility 104 selects a set of media categories for inclusion in the media guide GUI view. Management facility 104 may select the set of media categories in any suitable way based on a set of one or more predefined media category selection factors. Examples of predefined media category selection factors are described herein.

Figure 6:
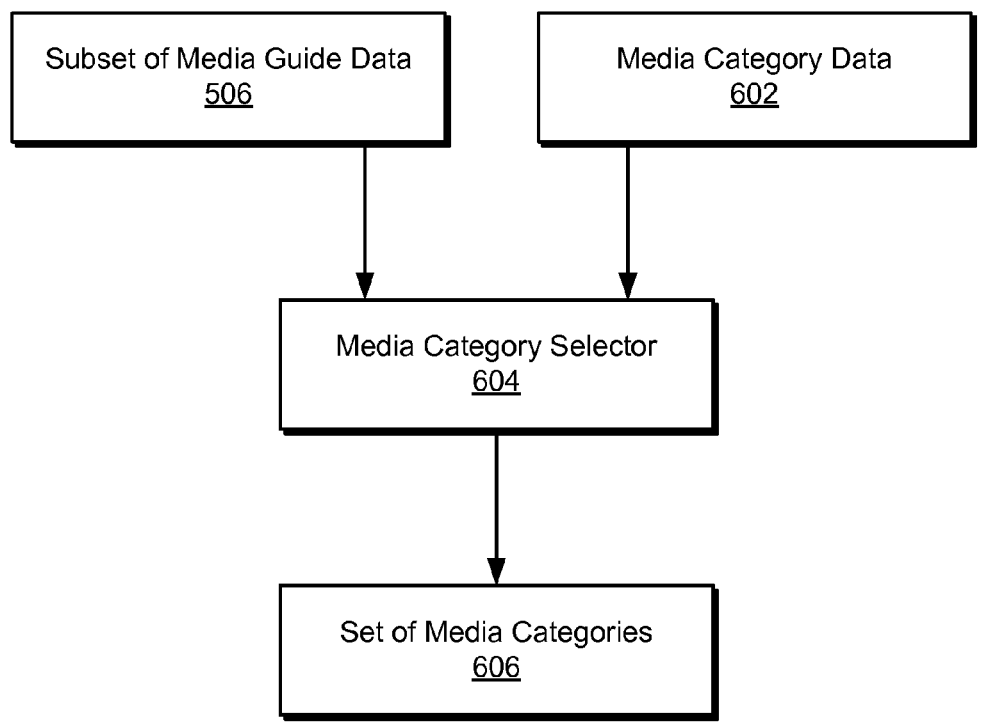
FIG. 6 illustrates an exemplary selection of a set of media categories according to principles described herein.

In certain examples, management facility 104 may select the set of media categories from a set of predefined media categories. FIG. 6 illustrates such an example in which media category data 602 represents an overall set of predefined media categories. The overall set of predefined media categories may be defined by management facility 104, a provider of the media service, an end user of the media service, a third party, or a combination thereof. Examples of media categories that may be represented by media category data 602 may include, without limitation, media program type categories such as sports, news, movies, reality, primetime, cooking, home improvement, crime dramas, etc. In certain examples, media categories may additionally or alternatively include categories related to social media activities. For instance, a media category may be defined to represent media programs that are trending on the TWITTER social media service. In certain examples, media categories may additionally or alternatively include curated categories such as a "superheroes" media category defined to include media programs about superheroes.

In step 404 of method 400, management facility 104 may apply a media category selector 604 to media category data 602 to determine a set of media categories 606 that is a subset of the overall set of predefined media categories represented by media category data 602. Application of the media category selector 604 may include applying one or more predefined media category selection factors to media category data 602 to generate the set of media categories 606. Examples of such factors will now be described. The exemplary factors may be used alone or in any suitable combination or sub-combination thereof.

In certain examples, the media category selection factors may include one or more time factors, and management facility 104 may select one or more media categories based on the time factors. For example, management facility 104 may select media categories based on a current date, a current time of day, and/or one or more media program distribution time slots. To illustrate, if the current time is within primetime hours, management facility 104 may select a "primetime shows" media category. If the current time is instead within weekday afternoon hours, management facility 104 may select a "talk shows" media category. If the current time is instead within weekday morning hours, management facility 104 may select a "preschool shows" media category. If the current time is instead within Saturday afternoon hours, management facility 104 may select a "sports shows" media category. These and/or other mappings of dates and times to particular media categories may be represented in the media category selector 604.

In certain examples, media category selection factors may include one or more media program factors, and management facility 104 may select one or more media categories based on the media program factors. For example, management facility 104 may select media categories based on attributes of the media programs represented by the set of media program data determined in step 402 of method 400. As shown in FIG. 6, for example, the subset of media guide data 506 may be used as input when media category selector 604 is applied to media category data 602 to generate the set of media categories 606. From the subset of media guide data 506, management facility 104 may determine and use one or more attributes of media programs represented by the subset of media guide data 506 to select one or more media categories from media category data 602. To illustrate, management facility 104 may determine that the subset of media guide data 506 represents a significant number of "news" type media programs. Based on this determination, management facility 104 may select a "news" media category. As another example, management facility 104 may determine that the subset of media guide data 506 represents a significant number of "movie" type media programs and, based on this determination, management facility 104 may select a "movies" media category.

In certain examples, media category selection factors may include one or more end user factors, and management facility 104 may select one or more media categories based on the end user factors. For example, management facility 104 may select media categories based on information about an end user of the media service. Such information, which may be represented in a user profile or in any other way, may include an interaction history of the user with the media service (e.g., a media program access history such as a watch history of the user), demographic information for the user, social media information for the user (e.g., information about a social media account and/or social media activities of the user), media service preferences defined by the user, and/or any other information about the user and/or an account of the user with the media service.

To illustrate one example, management facility 104 may select one or more media categories based on a watch history of the user of the media service, a watch history for an account with the media service (e.g., a household watch history), and/or a watch history for one or more media content access devices. For instance, management facility 104 may determine from a watch history that the user has a habit of watching media programs about cooking. Based at least in part on this determination, management facility 104 may select a "cooking shows" media category.

In certain examples, media category selection factors may include one or more user community factors, and management facility 104 may select one or more media categories based on the user community factors. For example, management facility 104 may select media categories based on information about a community of users of the media service. Such information may include information about current and/or historical viewing patterns of users of the media service, social media posts by users of the media service, popularity of media programs and/or media categories within the user community, and/or any other information about the user community.

To illustrate one example, management facility 104 may select one or more media categories based on popularity of media categories among users of the media service. For instance, management facility 104 may determine that a particular media category is frequently presented to and/or used by users of the media service. Based at least in part on this determination, management facility 104 may select the particular media category.

User community factors may be particularly useful when management facility 104 provides a media guide GUI view to a new user of the media service. The user may not have yet interacted with the media service enough to build a meaningful interaction history. Accordingly, management facility 104 may utilize user community factors as a baseline for providing the media guide GUI view.

In certain examples, a selection of media categories may include identifying and prioritizing media categories. For example, management facility 104 may identity a set of media categories for inclusion in a media guide GUI view and then prioritize the identified media categories for display arrangement in the media guide GUI view. To illustrate, management facility 104 may identify a number of media categories and prioritize the identified media categories relative to one another for display in a particular order in the media guide GUI view. The identification and/or prioritization may be performed by management facility 104 based on one or more of the media category selection factors described herein.

Returning to FIG. 4, in step 406, management facility 104 selects a category-specific set of media programs for inclusion in each media category. Management facility 104 may select a category-specific set of media programs in any suitable way based on a set of one or more predefined media program selection factors.

Figure 7:
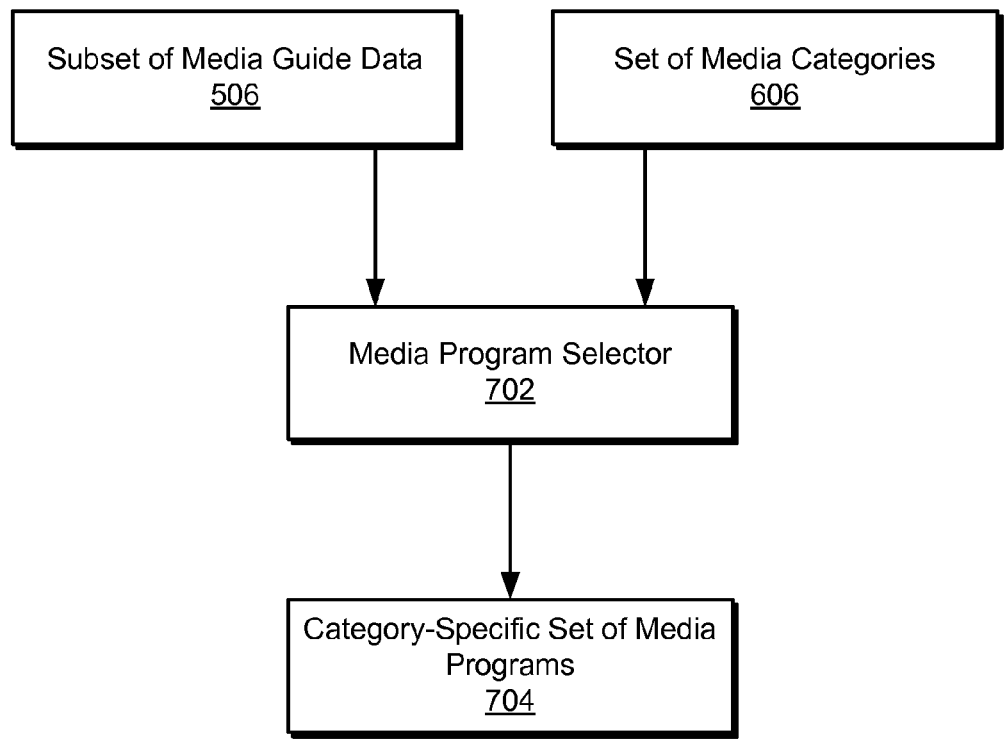
FIG. 7 illustrates an exemplary selection of a category-specific set of media programs according to principles described herein.

In certain examples, management facility 104 may select a category-specific set of media programs from the set of media programs determined in step 402. FIG. 7 illustrates such an example in which management facility 104 applies a media program selector 702 to the subset of media guide data 506 and the set of media categories 606 to determine a category-specific set of media programs 704. Application of the media program selector 702 may include applying one or more predefined media program selection factors to select the category-specific set of media programs from the subset of media guide data 506 for a particular media category included in the set of media categories 606.

To illustrate, the set of media categories 606 may include a "cooking shows" media category. Based on predefined media program selection factors, management facility 104 may select, from the media programs represented by the subset of media guide data 506, a particular set of media programs about cooking for inclusion in the category-specific set of media programs 704.

The predefined media program selection factors may include one or more of the media category selection factors described herein. For example, the predefined media program selection parameters may include one or more media program factors, end user factors, and/or user community factors.

In certain examples, a selection of media programs may include identifying and prioritizing media programs within a media category. For example, management facility 104 may identity a set of media programs for inclusion in a media category and then prioritize the identified media programs for display arrangement within the media category in the media guide GUI view. To illustrate, management facility 104 may identify a number of media programs for a media category and then prioritize the identified media programs relative to one another for display in a particular order within the media category in the media guide GUI view. The identification and/or prioritization may be performed by management facility 104 based on one or more of the media program selection factors described herein.

Returning to FIG. 4, in step 408, management facility 104 populates the media guide GUI view with user interface content that represents the selected set of media categories and the category-specific set of media programs selected for inclusion in each media category. Management facility 104 may populate the media guide GUI view with the user interface content in any suitable way, such as by providing media program listings content for inclusion in (e.g., for use in rendering) the media guide GUI view.

In step 410, management facility 404 provides the populated media guide GUI view for display on a display screen. Management facility 404 may provide the populated media guide GUI view for display on the display screen in any suitable way, such as by transmitting data representing the media guide GUI view to a display device for processing to display the media guide GUI view on the display screen.

The content and/or one or more features of the displayed media guide GUI view may facilitate convenient, meaningful, and/or efficient discovery and accessing of media content by the user of the media service. To this end, features of the media guide GUI view may facilitate user navigation of the media guide GUI view to discover and access content and/or features of the media guide GUI view, which may lead to discovery and access of media programs that are available for access through the media service.

In certain examples, management facility 104 may represent the selected set of media categories as a scrollable row of media category columns. In addition, each media category column may include a vertically-arranged list of entries representing the category-specific set of media programs selected for inclusion in the media category represented by the respective media category column.

Figure 8:
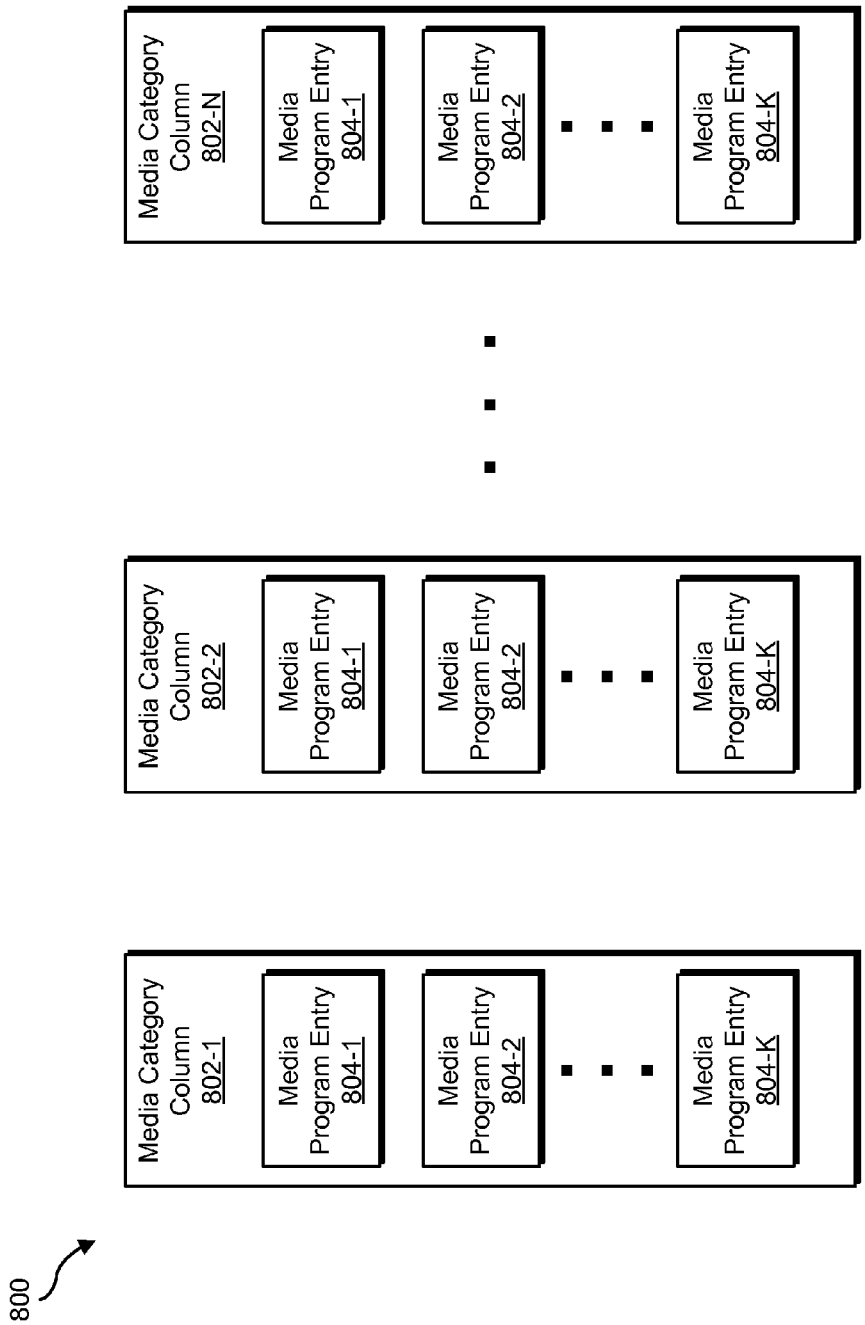
FIGS. 8-9 illustrate exemplary configurations of user interface content for a media guide graphical user interface view according to principles described herein.

FIG. 8 illustrates an exemplary configuration 800 of media category columns 802 (e.g., media category columns 802-1 through 802-N) and lists of media program entries 804 (e.g., lists of media program entries 804-1 through 804-K) representing category-specific sets of media programs within the media category columns 802. As shown, a set of media category columns 802 may be arranged as a horizontal row. The row of media category columns 802 may be scrollable within a media guide GUI view such that the user may provide input to navigate from one media category column 802 to another, which navigation may cause the row of media category columns 802 to scroll relative to the display screen on which the media guide GUI view is displayed.

In certain examples, the navigation may include movement of a highlighter object (not shown) relative to the media category columns 802 and/or movement of the media category columns 802 relative to the highlighter object. A media category column 802 in which the highlighter object is positioned may function as an active media category column 802. When active, a media category column 802 may be vertically navigable. In certain examples, vertical navigation within the media category column 802 may include movement of the highlighter object relative to the list of media program entries 804 within the media category column 802 and/or movement of the list of media program entries 804 relative to the highlighter object. The list of media program entries 804 may be scrollable such that navigation from one media program entry 804 to another media program entry 804 in the list may cause the list of media program entries 804 to scroll relative to the display screen on which the media guide GUI view is displayed. Accordingly, the user may provide input to navigate to a particular media category column 802 within the row of media category columns 802 and then to a particular media program entry 804 within the list of media program entries 804 included in the particular media category column 802.

In certain examples, when a particular media program entry 804 is highlighted, management facility 104 may spatially expand the highlighted entry 804 on the display screen. For example, the screen space allocated to the entry 804 may expand and/or the size of the entry 804 may expand relative to other entries 804. Management facility 104 may populate the expanded entry 804 with additional information about the media program represented by the entry 804, such as additional metadata information (e.g., episode name, closed captioning information, rating information, badge information indicating whether the media program is newly available, soon to become unavailable, included in a watch list, etc.) about the media program.

In certain examples, while a media guide GUI view is displayed, a user of the media service may provide input to add a media program represented by a highlighted entry 804 to a watch list for the user. This may be performed using any suitable user input. In certain implementations, for example, a button of a remote control device configured for use by the user to control media content access device 202 may be dedicated for use to add a media program to the watch list while the media guide GUI is displayed.

In certain examples, only a subset of the media category columns 802 included in the set of media category columns 802 and/or only a subset of media program entries 804 included in a list of media program entries 804 is displayed on a display screen at a given time. In such examples, navigation within the media category columns 802 or list of media program entries 804 may cause scrolling of media category columns 802 or media program entries 804 on and off screen.

In certain examples, one or more bookend columns may be appended at one or more ends of the row of media category columns 802. For example, a catch-all media category column may be appended at a right end of the row of media category columns 802 and may be another selectable column within the row. Additionally or alternatively, a menu such as menu 308 of selectable menu options 310 may be appended at a left end of the row of media category columns 802 and may be another selectable column within the row.

Figure 9:
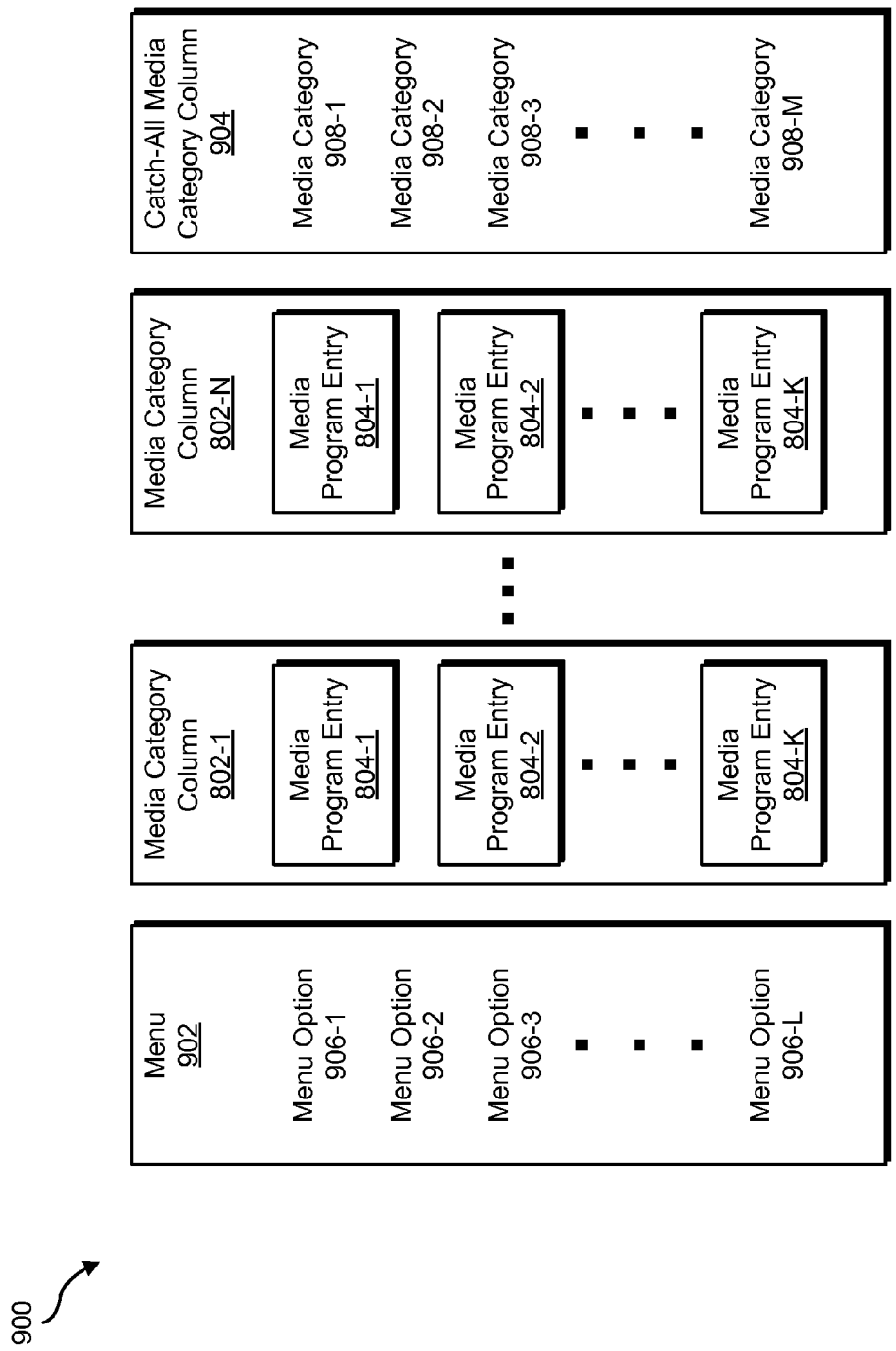

FIG. 9 illustrates an exemplary configuration 900 of a scrollable row of columns that includes a menu 902 positioned as a left bookend column, a set of media category columns 802, and a catch-all media category column 904 positioned as a right bookend column. As shown, menu 902 may include a list of selectable menu options 906 (e.g., menu options 906-1 through 906-L), and catch-all media category column 904 may include a catch-all list of media categories 908 (e.g., media categories 908-1 through 908-M).

A user may provide input to scroll horizontally within configuration 900 to highlight and thereby activate a column within the row such that the list of options within the active column becomes vertically navigable. As an example, the user may provide input to navigate to and select a menu option 906 included in menu 902, which selection may be detected by detection facility 102 to be a request to access a particular media guide GUI view, as described herein. As another example, the user may provide input to navigate to and select a particular media category 908 represented in the catch-all list of media categories 908 included in the catch-all media category column 904. In response to the selection, management facility 104 may launch a search user interface in which search results for a search based on the selected media category 908 are displayed. The search results may include a list of media programs that fit the media category 908. In certain examples, the list of media programs that fit the media category 908 may be filtered based on the type of media guide GUI view from which the media category 908 was selected. For example, if the media guide GUI view is an "on now" view, the list of media programs in the search results may include only media programs that are on now.

In certain examples, one or more endpoint entries may be appended at one or more ends of a vertical list of entries included in a media category column 802. For example, a catch-all media program entry may be appended at the bottom of the list of entries in the media category column 802 and may be another selectable entry within the media category column 802. In response to a user selection of the catch-all media program entry, management facility 104 may launch a user interface in which information about additional media programs that are included in the media category represented by the media category column 802 but are not individually represented by media program entries 804 within the media category column 802 is presented.

In addition or alternative to the catch-all media program entry, one or more other entries, such as a menu option entry, may be appended at the top or the bottom of the list of entries in the media category column 802 (or at any other suitable location within the list) and may be one or more other selectable entries in the media category column 802. In certain examples, the media category column 802 may include a menu option selectable by the user to access information about media programs for the category represented by the media category column 802 as that media category column 802 would be represented in a different view of media guide GUI. For example, while an "on now" view of the media guide GUI is displayed, a media category column 802 may include a menu option selectable by the user to access information about media programs for the same category and that were distributed earlier in time of the one or more time slots that overlap the current time. For example, the menu option may be selectable to trigger display of information about media programs that finished being distributed in one or more sequentially previous time slots (e.g., the previous thirty-minute or sixty-minute time slots).

In some instances, the information may be presented in the media category column 802 as the media category column 802 would appear in an "on earlier" view of the media guide GUI. For example, in response to a selection of the menu option, the media category column 802 may be updated from representing a category of media programs scheduled for distribution during one or more time slots that overlap the current time to representing the category of media programs that were distributed during one or more time slots that temporally precede the one or more time slots that overlap the current time.

Such a feature may be referred to as a "look-back" feature of the media guide GUI and may apply to an "on now" view and/or an "on later" view of the media guide GUI. When the menu option is selected in an "on now" view of the media guide GUI, management facility 104 may provide information that allows the user to look back in time, within the same category, at previously distributed media programs. When the menu option is selected in an "on later" view of the media guide GUI, management facility 104 may provide information that allows the user to look back in time, within the same category, at currently distributed media programs.

In certain examples, management facility 104 may insert one or more promotional entries in a category column 802. For example, management facility 104 may insert an advertisement entry and/or an entry featuring a media program that fits within the category represented by the category column 802. A promotional entry may be inserted within or appended to a list of entries 804 in the category column 802 in some examples, or the promotional entry may be the only entry in the category column 802 in some examples in which the category column 802 is a dedicated promotional column.

In certain examples, categories, lists of media programs, and/or lists of media providers may be manually curated for inclusion in media guide GUI views. To this end, management facility 104 may provide an administrative user interface for use by personnel of the media service provider to provide input to define categories, lists of media programs, and/or lists of media providers for inclusion in media guide GUI views. Additionally or alternatively, management facility 104 may provide a user interface for use by an end user of the media service to provide input to define categories, lists of media programs, and/or lists of media providers for inclusion in media guide GUI views.

One or more of the principles described above may be applied by management facility 104 to provide different views of a media guide GUI. For example, while certain examples, content, and features described above have been described in the context of "on now" view 300, other views, such as "on later," "on earlier," and "networks" views may be provided by management facility 104 using one or more of the same or similar principles. Examples of certain other views of the media guide GUI will now be described.

Figure 10:
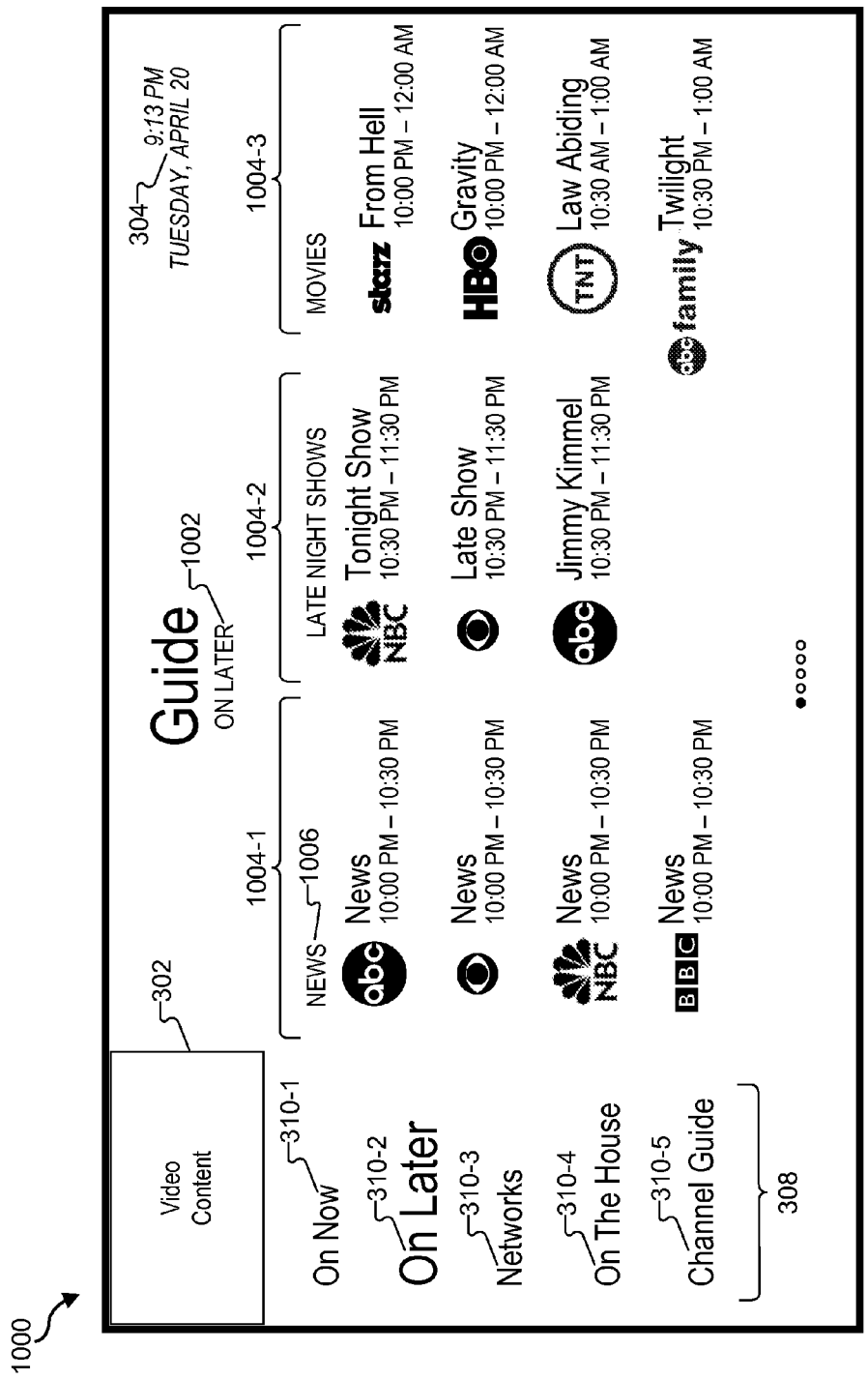
FIGS. 10-13 illustrate exemplary media guide graphical user interface views according to principles described herein.

FIG. 10 illustrates an exemplary media guide GUI view 1000 ("view 1000") that may be provided by management facility 104 for display on a display screen. As shown, view 1000 may include user interface content and features similar to those of view 300 shown in FIG. 3. For example, view 1000 may include header content such as video window 302, time and date information 304, and an indicator 1002 that indicates that view 1000 is an "on later" view of the media guide GUI. View 1000 may also include menu content such as menu 308 of selectable menu options 310.

View 1000 may additionally include media program listings content arranged to represent media programs by media category. As shown, for example, view 1000 may include media categories arranged as a row of media category columns 1004 (e.g., media category columns 1004-1 through 1004-3). In the illustrated example, media category column 1004-1, which is labeled "news," is dedicated to representing media programs related to the topic of news, media category column 1004-2, which is labeled "late night shows," is dedicated to representing media programs that are late night talk shows, and media category column 1004-3, which is labeled "movies," is dedicated to representing media programs that are movies.

Each media category column 1004 may include a media category indicator. For example, media category column 1004-1 includes a media category indicator 1006 in the form of text indicating the media category represented by media category column 1004-1.

Each media category column 1004 may include a vertically-arranged list of entries representing media programs of the media category represented by the respective media category column 1004. For example, media category column 1004-1 includes a list of entries representing "news" media programs. An entry may represent an individual media program and may include any suitable information about the media program, such as a media channel indicator (e.g., a channel or provider logo) indicating the media channel on which the media program is scheduled to be distributed, a title of the media program, and a time slot during which the media program is scheduled to be distributed.

Content and features of view 1000 may be navigable by the user in any of the ways described herein. For example, the row of media category columns 1004 and the lists of media program entries within each of the media category columns 1004 may be navigable as described herein.

View 1000 is dedicated (e.g., exclusively) to presenting information about media programs scheduled for distribution by way of the media service during one or more time slots that are temporally subsequent to one or more time slots that overlap the current time. As shown, for example, view 1000 includes information only about media programs that are scheduled for distribution during time slots that are temporally subsequent to time slots that overlap the current time.

In some examples, view 1000 may include information about media programs scheduled for distribution during any future-in-time time slot. In other examples, view 1000 may include information only about media programs that are scheduled for distribution during time slots that are sequentially next in time after one or more time slots that overlap the current time.

Management facility 104 may populate view 1000 with media program listings content that represents media categories and media programs that are meaningful and/or of interest to the user. To this end, management facility 104 may perform one or more steps of method 400 shown in FIG. 4 as described herein to provide view 1000. Because view 1000 is an "on later" view of the media guide GUI, in step 402, management facility 104 may apply view relevancy filter 504 in a manner that determines a set of media guide data that includes information only about a set of media programs that are scheduled for distribution during one or more time slots that are temporally subsequent to one or more time slots that overlap the current time. The remaining steps of method 400 may then be performed as described herein to select media categories, select category-specific media programs for each media category, and populate and provide view 1000 for display.

In addition or alternatively to providing "on now" and/or "on later" views of the media guide GUI, in certain examples management facility 104 may provide an "on earlier" view of the media guide GUI that is dedicated (e.g., exclusively) to presenting information about media programs that have been recently distributed, in accordance with a distribution schedule, by way of the media service during one or more time slots that temporally preceded one or more time slots that overlap the current time. For example, an "on earlier" view may include information only about media programs that have been distributed during time slots that are previous in time (e.g., immediately previous in time) of time slots that overlap the current time. Such a view may facilitate the user of the media service looking back in time to discover and access media programs that have been recently distributed by way of the media service.

The recently distributed media programs may be made accessible to the user in any suitable way. For example, the distribution of the media programs during the earlier-in-time time slots may be recorded (e.g., by a provider and/or network DVR system) when the media programs are being distributed and may be made accessible to the user for a certain period of time (e.g., up to three days after the scheduled distribution occurred). The "on earlier" view of the media guide GUI may help the user to discover and access such media programs that are accessible through a "look-back" or "catch-up" feature of the media service.

Management facility 104 may populate an "on earlier" view of the media guide GUI with media program listings content that represents media categories and media programs that are meaningful and/or of interest to the user. To this end, management facility 104 may perform one or more steps of method 400 shown in FIG. 4 as described herein to provide the "on earlier" view. Because the "on earlier" view of the media guide GUI is dedicated to presenting information about previously distributed media programs, in step 402, management facility 104 may apply view relevancy filter 504 in a manner that determines a set of media guide data that includes information only about a set of media programs that were recently distributed during one or more time slots that temporally precede (i.e., that are previous in time of) one or more time slots that overlap the current time. The remaining steps of method 400 may then be performed as described herein to select media categories, select category-specific media programs for each media category, and populate and provide the "on earlier" view for display.

Figure 11:
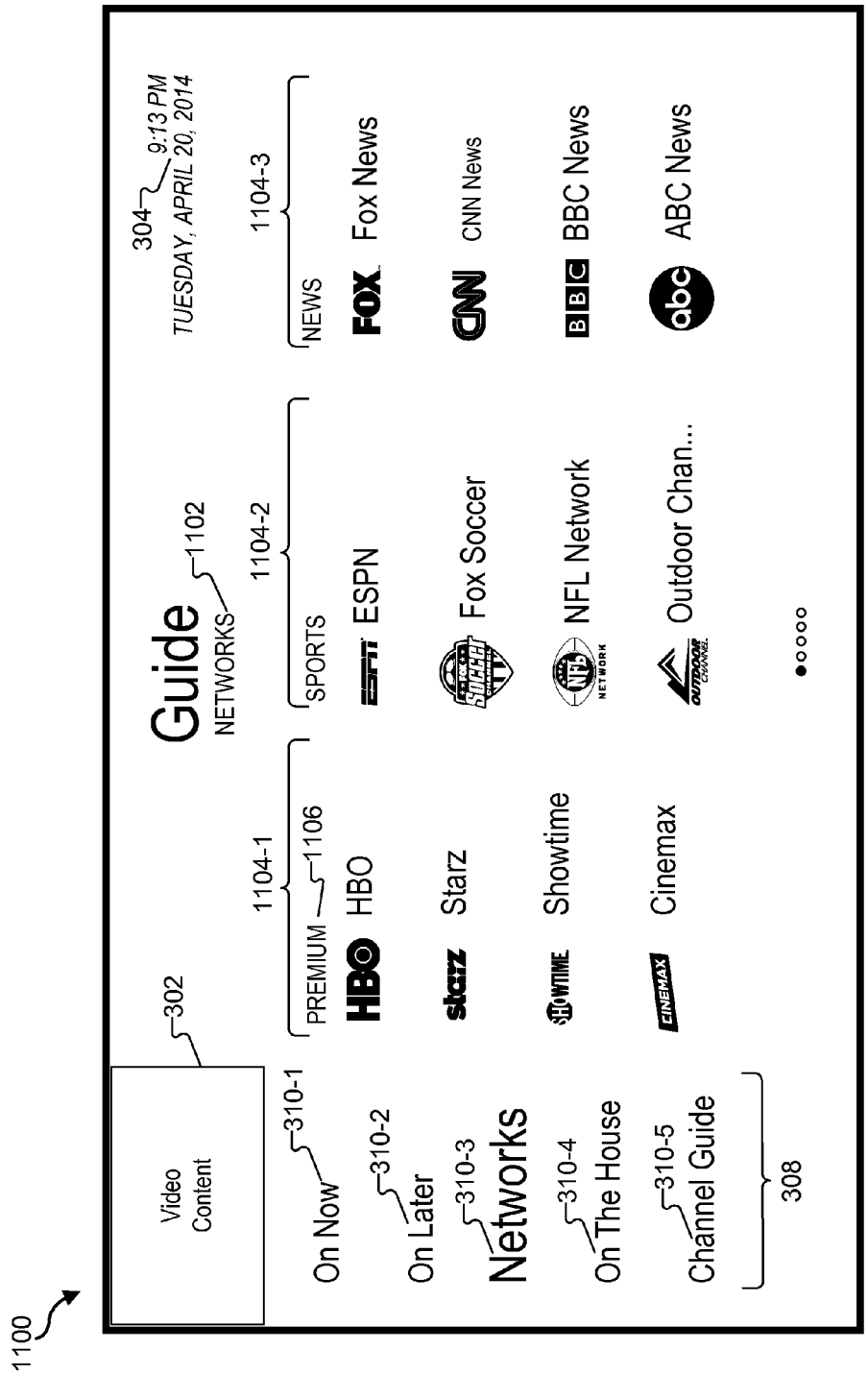

FIG. 11 illustrates an exemplary media guide GUI view 1100 ("view 1100") that may be provided by management facility 114 for display on a display screen. As shown, view 1100 may include user interface content and features similar to those of view 300 shown in FIG. 3. For example, view 1100 may include header content such as video window 302, time and date information 304, and an indicator 1102 that indicates that view 1100 is a "networks" view of the media guide GUI. View 1100 may also include menu content such as menu 308 of selectable menu options 310.

View 1100 is dedicated (e.g., exclusively) to presenting information about portals for providers of media programs distributed by way of the media service. Such portals may also be referred to as "provider portals" or "network portals" inasmuch as the providers of media programs may be networks such as ABC, NBC, etc. To this end, view 100 may include portal listings content that represents portals for the media program providers. The portal listings content may include entries that represent the portals and that are selectable by a user to access the portals, which may be separate user interfaces and/or may allow the user to browse information and/or media programs for the provider brands (e.g., such as a provider's media on-demand catalog and/or media distribution schedule). As shown in FIG. 11, view 1100, which may be referred to as "portals" view 1100, may include information only about portals for providers of media programs distributed by way of the media service.

View 1100 may include portal listings content arranged to represent portals by category. As shown, for example, view 1100 may include categories arranged as a row of category columns 1104 (e.g., category columns 1104-1 through 1104-3). In the illustrated example, category column 1104-1, which is labeled "premium," is dedicated to representing portals of providers of premium media programs and/or channels, category column 1104-2, which is labeled "sports," is dedicated to representing portals of providers of media programs and/or channels related to sports, and category column 1104-3, which is labeled "news," is dedicated to representing portals of providers of media programs and/or channels related to news.

Each category column 1104 may include a category indicator. For example, category column 1104-1 includes a category indicator 1106 in the form of text indicating the category represented by category column 1104-1.

Each category column 1104 may include a vertically-arranged list of entries representing portals of providers of media programs of the category represented by the respective category column 1104. For example, category column 1104-1 includes a list of entries representing portals of providers of "premium" media programs. An entry may represent an individual portal and may include any suitable information about the portal, such as a provider indicator (e.g., a channel or provider logo) indicating the provider and a title of the provider. When an entry is highlighted, the entry may be expanded and may include additional information about the associated provider and/or media programs provided by the provider. For example, an expanded entry may present information indicating a media program that is currently being distributed on a media channel associated with the provider (e.g., a title, rating, and/or time slot for the media program) and/or a media program that is scheduled to be distributed next on the media channel (e.g., a title and start time for the media program).

Categories represented in view 1100 may include media categories as described herein and/or any other categorizations of portals of providers of media programs, media programs provided by the providers, and/or media channels of the providers.

Content and features of view 1100 may be navigable by the user in any of the ways described herein. For example, the row of category columns 1104 and the lists of portal entries within each of the category columns 1104 may be navigable as described herein.

Management facility 104 may populate view 1100 with portal listings content that represents categories and media provider portals that are meaningful and/or of interest to the user. To this end, management facility 104 may perform one or more steps of method 400 shown in FIG. 4 as described herein to provide view 1100. Because view 1100 is a "portals" view of the media guide GUI, step 402 may be omitted or adjusted such that management facility 104 may apply view relevancy filter 504 in a manner that determines a set of media guide data that includes information about media providers that provide media programs distributed by way of the media service. The remaining steps of method 400 may then be performed as described herein to select categories, select category-specific provider portals for each category, and populate and provide view 1100 for display.

The user of the media service may use menu 308 to toggle between different views of the media guide GUI. For example, while a particular view of the media guide GUI is displayed on a display screen, the user may provide input to select a menu option 310 mapped to another view of the media guide GUI. Detection facility 102 may detect the selection as a request for the other view of the media guide GUI, and management facility 104 may provide the other view of the media guide GUI for display on the display screen in response to the request. The display of the other view of the media guide GUI may replace the particular view of the media guide GUI on the display screen.

To illustrate, returning to FIG. 3, with view 300 displayed on a display screen, the user of the media service may provide input to select menu option 310-2 to request access to an "on later" view of the media guide GUI. Detection facility 102 may detect the selection of menu option 310-2 as a request for an "on later" view of the media guide GUI. In response to the request, management facility 104 may provide an "on later" view of the media guide GUI view for display on the display on the display screen in place of view 300. For instance, management facility 104 may provide view 1000 for display in place of view 300 on the display screen. In this or a similar manner, management facility 104 may switch from one view to another, separate view of the media guide GUI in a manner that allows the user to conveniently toggle between the views.

While a view of the media guide GUI is displayed on a display screen, a natural passage of time may move the current time across a time slot boundary (e.g., from one time slot to another time slot as may occur at a time slot boundary such as an hour or half-hour time mark) such that the new current time is not overlapped by the same one or more time slots that overlap the old current time. Detection facility 102 may detect that the passage of time has caused the current time to move across the time slot boundary, and, in response, management facility 104 may update the displayed view of the media guide GUI based on the new current time. For example, management facility 104 may perform one or more steps of method 400 shown in FIG. 4 to repopulate the displayed view of the media guide GUI based on the new current time.

In certain examples, management facility 104 may apply an update globally to the displayed view of the media guide GUI (e.g., to all content in the displayed view of the media guide GUI). In other examples, management facility 104 may selectively update or refrain from updating certain content in the displayed view of the media guide GUI. For instance, management facility 104 prevent removal of certain content from the displayed view of the media guide GUI. To illustrate, management facility 104 may prevent removal of a highlighted category (e.g., a highlighted category column) and/or a highlighted media program (e.g., a highlighted media program entry) from the displayed view of the media guide GUI. This may help the user to be able to continue with the user's activity within the displayed view of the media program GUI uninterrupted by an update to the view being caused by the passage of time. For example, the user may continue to view information about and/or select a highlighted category and/or media program. In certain examples, management facility 104 may update information about the highlighted category and/or media program to reflect the transition caused by the passage of time, such as by inserting indicators to indicate that the highlighted category and/or media program has transitioned from currently being distributed to having been distributed in the past or has transitioned from being scheduled for future distribution to being currently distributed.

Figure 12:

To illustrate an example, FIG. 12 shows an "on now" view 1200 ("view 1200") of the media guide GUI in which a particular media program within a particular media category is highlighted. In particular, a media program titled "Forever" is highlighted within a media category labeled "primetime shows." In response to the media program being highlighted, a list entry representing the media program has been expanded and includes a provider logo, a video window in which live video content of the media program is played back, a title of the media program, an indicator of the time slot during which the media program is being distributed, series and episode information (e.g., series number, episode number, and episode title), a brief synopsis of the subject matter of the media program, and other information about the media program, as shown in FIG. 12. The media category column representing the media category has also been expanded in size, as has another listing entry representing another media program titled "Person of Interest" within the media category column.

With view 1200 displayed as shown in FIG. 12, a passage of time may cause the current time to move across a time slot boundary. For example, the current time may change from 9:59 PM to 10:00 PM while view 1200 is displayed. In response, management facility 104 may perform one or more operations to update view 1200 based on the new current time.

Figure 13:
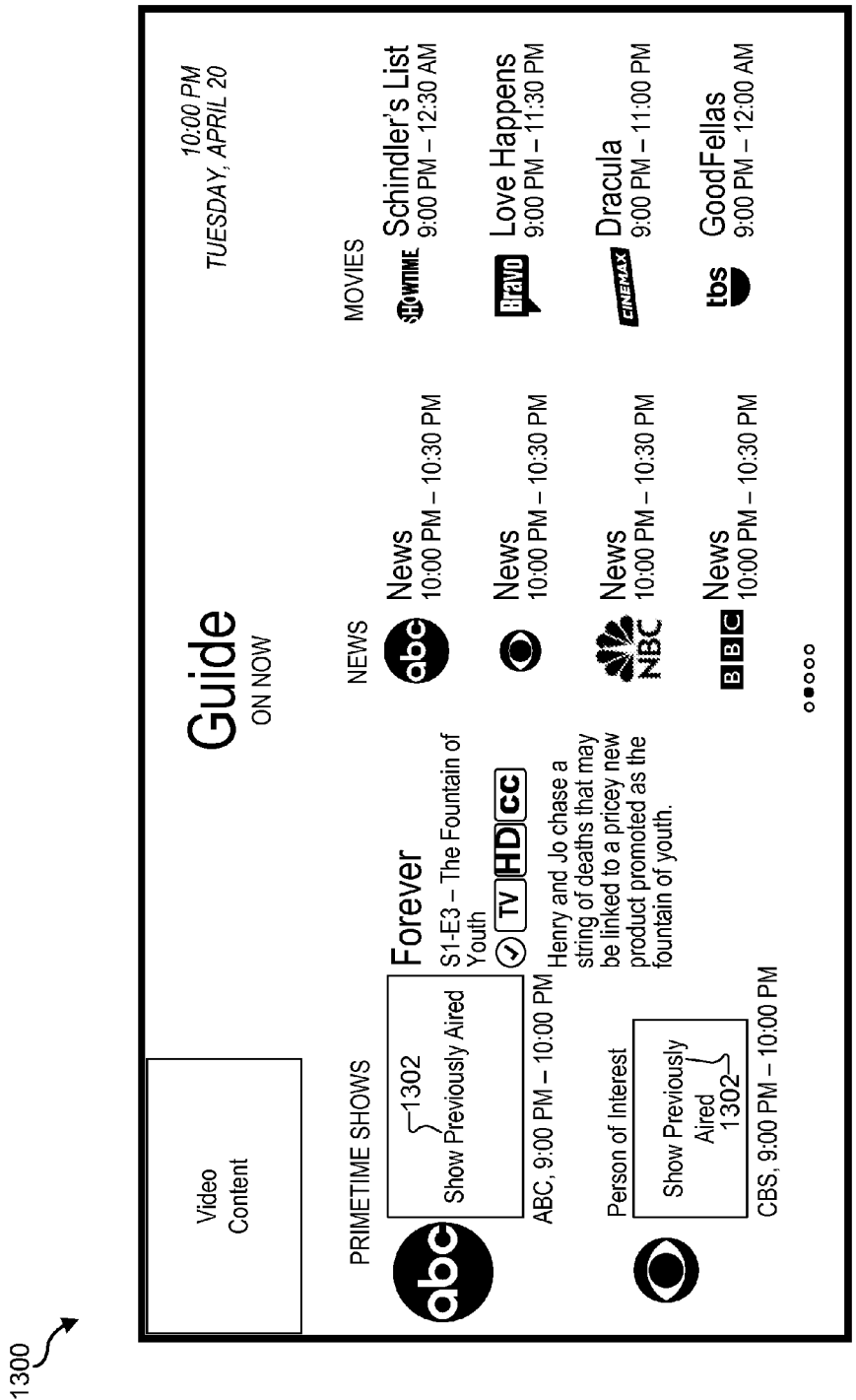

FIG. 13 illustrates an updated "on now" view 1300 ("view 1300") of the media guide GUI that has been updated for a new current time of 10:00 PM. As shown, the "cooking" media category shown in view 1200 has been replaced with a "news" media category in view 1300, the "news" media category including entries for news media programs that are on now as of the current time of 10:00 PM. The "movies" media category of view 1200 has been kept in view 1300 based on the media programs in the "movies" media category still being "on now" at 10:00 PM.

The "primetime shows" media category of view 1200 has been kept in view 1300 based on the media category or a media program within the media category being highlighted at the time of transition from 9:59 PM to 10:00 PM. That is, management facility 104 has prevented the "primetime shows" media category and its currently displayed content from being removed as part of the updating of view 1200 based on the media category or a media program within the media category being highlighted at the time of the update. Accordingly, the user may continue to view and select the entries included in the media category.

As shown in FIG. 13, as part of the update, management facility 104 has inserted indicators in the media category column for the media category to indicate that the media programs have transitioned from being currently distributed to having been previously distributed. In particular, instead of playing back live video content in video windows, indicators 1302 indicating that the media programs were previously aired are presented in the windows in place of the live video content.

In the example illustrated in FIG. 13, management facility 104 prevented removal on entries for two media programs included in the "primetime shows" media category. This is illustrative only. In other examples, management facility 104 may prevent removal of only the highlighted media program and may update one or more other media programs included in the media category. For example, the media program titled "Person of Interest" may be updated such as by being replaced by another media program that is "on now" at 10:00 PM.

By preventing removal of select content from a view of a media guide GUI when the view is updated based on a transition of the current time across a time slot boundary, management facility 104 may help ease the transition for the user at least by providing the user with the ability to continue viewing and/or to access select content included in the pre-transition view.

Figure 14:
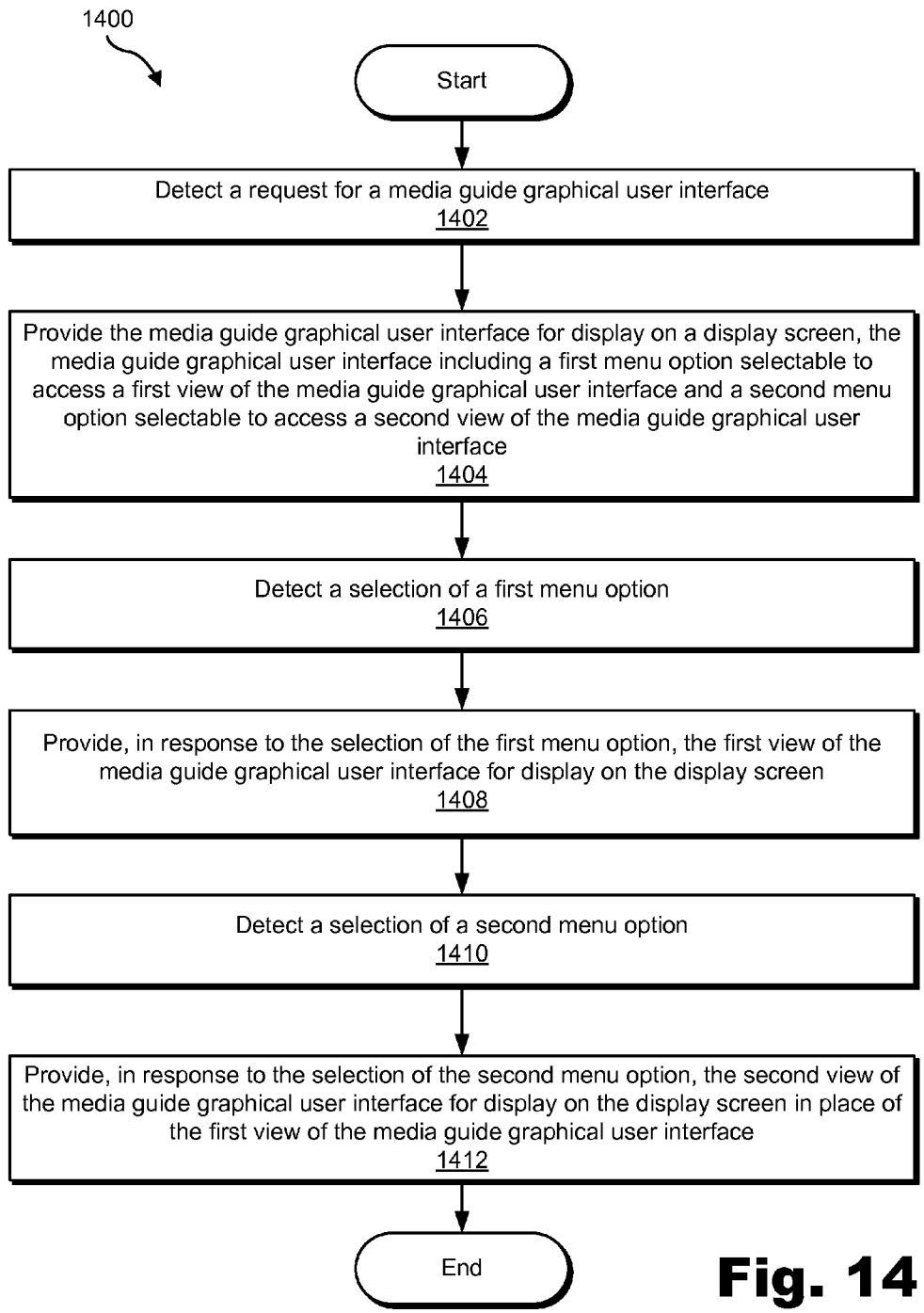
FIGS. 14-15 illustrate exemplary media guide user interface methods according to principles described herein.

FIG. 14 illustrates an exemplary method 1400 of providing a media guide GUI view. While FIG. 14 illustrates an exemplary method according to certain embodiments, other embodiments may omit, add to, reorder, combine, and/or modify any of the steps shown in FIG. 14. In certain embodiments, one or more steps shown in FIG. 14 may be performed by system 100 and/or one or more components or implementations of system 100, such as management facility 104, media content access device 202, and/or media service server system 204.

In step 1402, a media guide user interface system detects a request for a media guide GUI, such as described herein. The request may be for a particular view of the media guide GUI.

In step 1404, the media guide user interface system provides the media guide GUI for display on a display screen in any of the ways described herein. The media guide GUI may include menu options such as a first menu option selectable to access a first view of the media guide GUI and a second menu option selectable to access a second view of the media guide GUI, as described herein.

In step 1406, the media guide user interface system detects a selection of the first menu option, such as described herein.

In step 1408, the media guide user interface system provides the first view of the media guide GUI for display on the display screen in response to the selection of the first menu option. Step 1408 may be performed in any of the ways described herein.

In step 1410, the media guide user interface system detects a selection of the second menu option, such as described herein. For example, while the first view of the media guide GUI is displayed on the display screen, the media guide user interface system may detect a user selection of the second menu option.

In step 1412, the media guide user interface system provides, in response to the selection of the second menu option, the second view of the media guide GUI for display on the display screen in place of the first view of the media guide GUI. Step 1412 may be performed in any of the ways described herein.

Figure 15:
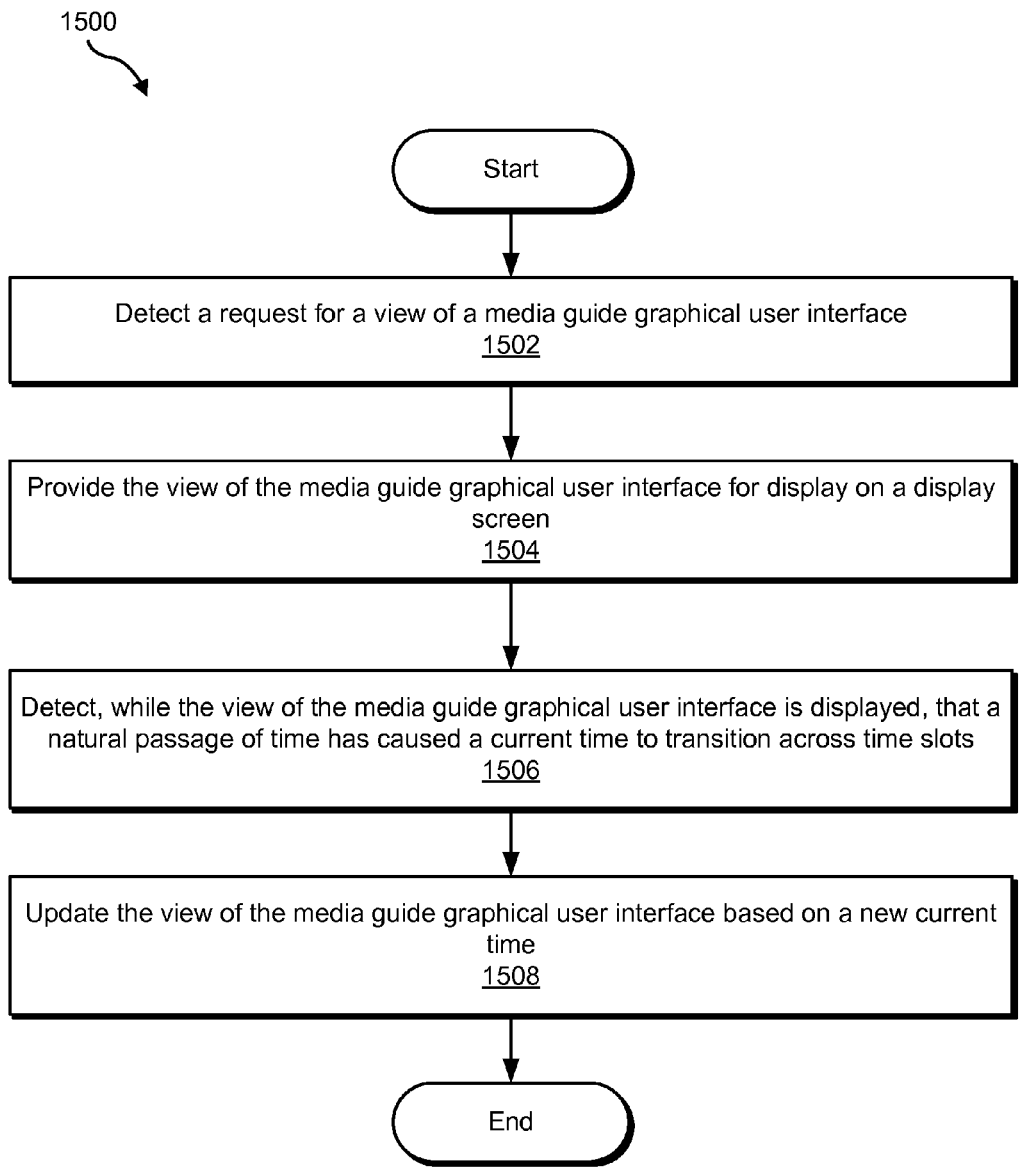

FIG. 15 illustrates an exemplary method 1500 of providing a media guide GUI view. While FIG. 15 illustrates an exemplary method according to certain embodiments, other embodiments may omit, add to, reorder, combine, and/or modify any of the steps shown in FIG. 15. In certain embodiments, one or more steps shown in FIG. 15 may be performed by system 100 and/or one or more components or implementations of system 100, such as management facility 104, media content access device 202, and/or media service server system 204.

In step 1502, a media guide user interface system detects a request for a view of a media guide GUI, such as described herein.

In step 1504, the media guide user interface system provides the view of the media guide GUI for display on a display screen in any of the ways described herein.

In step 1506, while the view of the media guide GUI is displayed, the media guide user interface system detects that a natural passage of time has caused a current time to transition across a time slot boundary, such as described herein.

In step 1508, the media guide user interface system updates the view of the media guide GUI based on a new current time. Step 1508 may be performed in any of the ways described herein. For example, the updating may include the media guide user interface system preventing certain content of the view of the media guide GUI from being removed as part of the update, such as described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a Compact Disc Read-Only Memory ("CD-ROM") disc, Digital Video Disc ("DVD"), any other optical medium, a random access memory ("RAM") device, a programmable read-only memory ("PROM") device, an erasable programmable read only memory ("EPROM") device, an Electrically Erasable Programmable Read-Only Memory ("EEPROM") device, a Flash EEPROM device, any other memory chip or cartridge, or any other tangible medium from which a computer can read.

Figure 16:
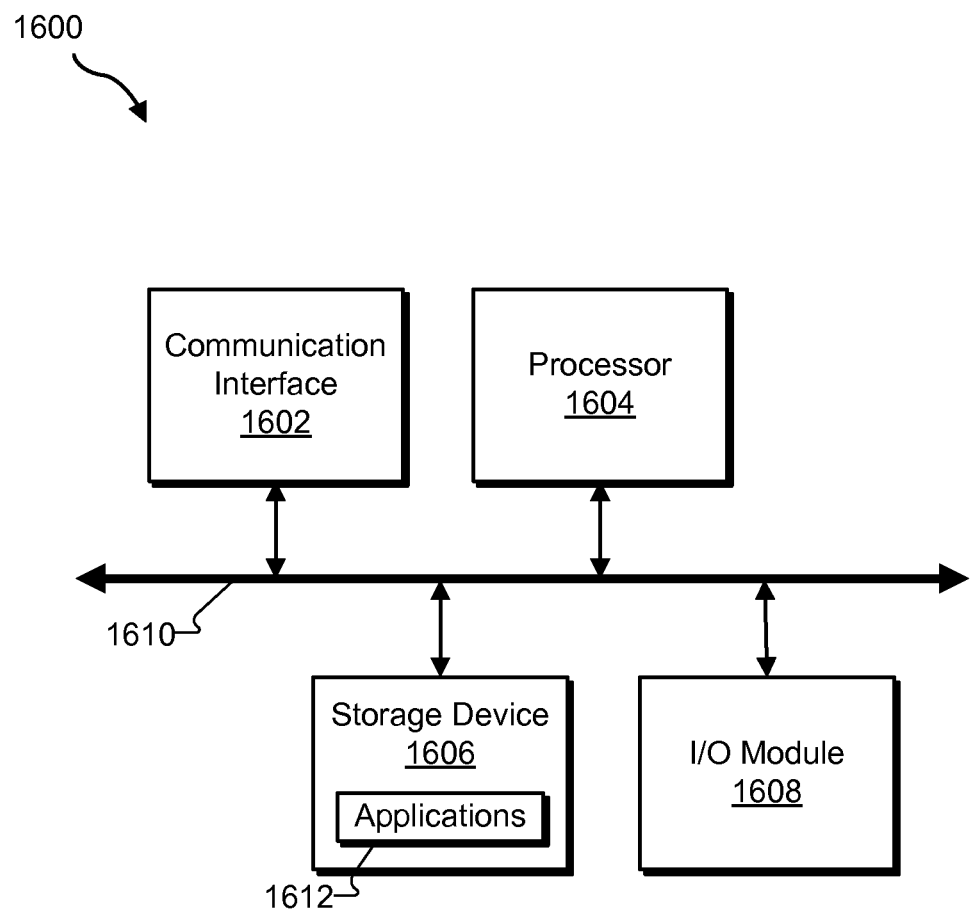
FIG. 16 illustrates an exemplary computing device according to principles described herein.

FIG. 16 illustrates an exemplary computing device 1600 that may be configured to perform one or more of the processes described herein. As shown in FIG. 16, computing device 1600 may include a communication interface 1602, a processor 1604, a storage device 1606, and an input/output ("I/O") module 1608 communicatively connected via a communication infrastructure 1610, which generally represents any form of communication structure that transfers data between components inside a computer, or between computers, and may include, but is not limited to, an internal system bus, an external expansion bus, network infrastructure, or other suitable communications structure. While an exemplary computing device 1600 is shown in FIG. 16, the components illustrated in FIG. 16 are not intended to be limiting. Additional or alternative components may be used in other embodiments. Components of computing device 1600 shown in FIG. 16 will now be described in additional detail.

Communication interface 1602 may be configured to communicate with one or more computing devices. Examples of communication interface 1602 include, without limitation, a wired network interface (such as a network interface card), a wireless network interface (such as a wireless network interface card), a modem, an audio/video connection, and any other suitable interface.

Processor 1604 generally represents any type or form of processing unit capable of processing data or interpreting, executing, and/or directing execution of one or more of the instructions, processes, and/or operations described herein. Processor 1604 may direct execution of operations in accordance with one or more applications 1612 or other computer-executable instructions such as may be stored in storage device 1606 or another computer-readable medium.

Storage device 1606 may include one or more data storage media, devices, or configurations and may employ any type, form, and combination of data storage media and/or device. For example, storage device 1606 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 1606. For example, data representative of one or more executable applications 1612 configured to direct processor 1604 to perform any of the operations described herein may be stored within storage device 1606. In some examples, data may be arranged in one or more databases residing within storage device 1606.

I/O module 1608 may be configured to receive user input and provide user output and may include any hardware, firmware, software, or combination thereof supportive of input and output capabilities. For example, I/O module 1608 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1608 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1600. For example, one or more applications 1612 residing within storage device 1606 may be configured to direct processor 1604 to perform one or more processes or functions associated with detection facility 102 and/or management facility 104. Likewise, storage facility 106 may be implemented by or within storage device 1606.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a media guide user interface system, a request for a media guide graphical user interface;
   providing, by the media guide user interface system in response to the request, the media guide graphical user interface for display on a display screen of a display device, the media guide graphical user interface comprising a menu of selectable menu options that include
      a first menu option selectable to access a first view of the media guide graphical user interface, the first view of the media guide graphical user interface dedicated to presenting information about media programs within a first set of media programs scheduled for distribution by way of a media service during one or more time slots that overlap a current time, the information about each of the media programs within the first set of media programs presented as an entry of at least one media category of a first subset of media categories included in the first view of the media guide graphical user interface, the first subset of media categories dynamically and automatically selected by the media guide user interface system from an overall set of predefined media categories by
         identifying fewer than all of the predefined media categories in the overall set based on one or more predefined media category selection factors when the first view of the media guide graphical user interface is accessed, and
         prioritizing the identified fewer than all of the predefined media categories in the first subset of media categories for display arrangement based on the one or more predefined media category selection factors, and
      a second menu option selectable to access a second view of the media guide graphical user interface, the second view of the media guide graphical user interface dedicated to presenting information about media programs within a second set of media programs scheduled for distribution by way of the media service during one or more time slots that are temporally subsequent to the one or more time slots that overlap the current time, the information about each of the media programs within the second set of media programs presented as an entry of at least one media category of a second subset of media categories included in the second view of the media guide graphical user interface, the second subset of media categories dynamically and automatically selected by the media guide user interface system from the overall set of predefined media categories by
         identifying fewer than all of the predefined media categories in the overall set based on the one or more predefined media category selection factors when the second view of the media guide graphical user interface is accessed, and
         prioritizing the identified fewer than all of the predefined media categories in the second subset of media categories for display arrangement based on the one or more predefined media category selection factors;
   detecting, by the media guide user interface system, a user selection of the first menu option;
   providing, by the media guide user interface system in response to the detecting of the user selection of the first menu option, the first view of the media guide graphical user interface for display on the display screen;
   detecting, by the media guide user interface system, that a passage of time has caused the current time to move across a time slot boundary such that a new current time is not overlapped by the same one or more time slots that overlap the current time; and
   updating, by the media guide user interface system in response to the detecting that the passage of time has caused the current time to move across the time slot boundary, the first view of the media guide graphical user interface based on the new current time, the updating comprising preventing a removal, from the updated first view of the media guide graphical user interface, of at least one of a highlighted media category included in the subset of media categories and a highlighted media program included in the category-specific set of media programs.

2. The method of claim 1, further comprising:
   detecting, by the media guide user interface system while the first view of the media guide graphical user interface is displayed on the display screen, a user selection of the second menu option; and
   providing, by the media guide user interface system in response to the detecting of the user selection of the second menu option, the second view of the media guide graphical user interface for display on the display screen, the display of the second view of the media guide graphical user interface replacing the display of the first view of the media guide graphical user interface on the display screen.

3. The method of claim 1, wherein the providing of the first view of the media guide graphical user interface for display comprises:
   determining, from a set of media guide data that represents a scheduled distribution of media programs by way of a media service, a subset of media guide data that represents only media programs scheduled for distribution by way of the media service during the one or more time slots that overlap the current time,
   dynamically and automatically selecting, based on the one or more predefined media category selection factors, the first subset of media categories for inclusion in the first view of the media guide graphical user interface,
   selecting, from the media programs within the first set of media programs scheduled for distribution by way of the media service during the one or more time slots that overlap the current time, a category-specific set of media programs for inclusion in each media category included in the first subset of media categories,
   populating the first view of the media guide graphical user interface with user interface content that represents the first subset of media categories and the category-specific set of media programs selected for inclusion in each media category included in the first subset of media categories, and providing the populated first view of the media guide graphical user interface for display on the display screen of the display device.

4. The method of claim 1, wherein the one or more predefined media category selection factors comprise at least one of a time factor, a media program factor, an end-user factor, and a user community factor.

5. The method of claim 3, wherein the dynamic and automatic selecting of the first subset of media categories for inclusion in the first view of the media guide graphical user interface comprises identifying the fewer than all of the predefined media categories included in the first subset of media categories and prioritizing the identified fewer than all of the predefined media categories included in the first subset of media categories for display arrangement based on the one or more predefined media category selection factors.

6. The method of claim 3, wherein the updating of the first view comprises:
   determining, from the set of media guide data that represents the scheduled distribution of media programs by way of the media service, a new subset of media guide data that represents media programs scheduled for distribution by way of the media service during one or more time slots that overlap the new current time,
   dynamically and automatically selecting, based on the one or more predefined media category selection factors, a new subset of media categories from the overall set of predefined media categories and including fewer than all of the predefined media categories in the overall set for inclusion in the first view of the media guide graphical user interface,
   selecting, from the media programs scheduled for distribution by way of the media service during the one or more time slots that overlap the new current time, a new category-specific set of media programs for inclusion in each media category included in the new subset of media categories,
   populating the first view of the media guide graphical user interface with user interface content that represents the new subset of media categories and the new category-specific set of media programs selected for inclusion in each media category included in the new subset of media categories, and
   providing the populated first view of the media guide graphical user interface for display on the display screen of the display device.

7. The method of claim 3, wherein the first view of the media guide graphical user interface comprises:
   a row of media category columns that represent the first subset of media categories; and
   a list of category-specific media program entries within each media category column included in the row of media category columns.

8. The method of claim 1, further comprising:
   detecting, by the media guide user interface system, a user selection of the second menu option; and
   providing, by the media guide user interface system in response to the detecting of the user selection of the second menu option, the second view of the media guide graphical user interface for display on the display screen, the providing of the second view of the media guide graphical user interface for display comprising
   determining, from a set of media guide data that represents a scheduled distribution of media programs by way of a media service, a subset of media guide data that represents only media programs scheduled for distribution by way of the media service during the one or more time slots that are temporally subsequent to the one or more time slots that overlap the current time,
   dynamically and automatically selecting, based on the one or more predefined media category selection factors, the second subset of media categories for inclusion in the second view of the media guide graphical user interface including the second predefined media category,
   selecting, from the media programs within the second set of media programs scheduled for distribution by way of the media service during the one or more time slots that are temporally subsequent to the one or more time slots that overlap the current time, a category-specific set of media programs for inclusion in each media category included in the second subset of media categories, the category-specific set of media programs selected for inclusion in the second predefined media category including at least one of the significant number of media programs of the particular type associated with the second predefined media category,
   populating the second view of the media guide graphical user interface with user interface content that represents the second subset of media categories and the category-specific set of media programs selected for inclusion in each media category included in the second subset of media categories, and
   providing the populated second view of the media guide graphical user interface for display on the display screen of the display device.

9. The method of claim 1, wherein the menu of selectable options further includes:
   a third menu option selectable to access a third view of the media guide graphical user interface, the third view of the media guide graphical user interface dedicated to presenting information about portals for providers of media programs distributed by way of the media service; and
   a fourth menu option selectable to access a fourth view of the media guide graphical user interface, the fourth view of the media guide graphical user interface dedicated to presenting information about media programs in a matrix of cells positioned relative to a channel axis and a time axis.

10. The method of claim 1, wherein the menu of selectable options further includes a third menu option selectable to access a third view of the media guide graphical user interface, the third view of the media guide graphical user interface dedicated to presenting information about media programs within a third set of media programs scheduled for distribution by way of the media service during one or more time slots that temporally precede the one or more time slots that overlap the current time.

11. The method of claim 1, embodied as computer-executable instructions on at least one non-transitory computer-readable medium.

12. A method comprising:
   detecting, by a media guide user interface system, a request for an on-now view of a media guide graphical user interface to be displayed;
   providing, by the media guide user interface system, in response to the request, the on-now view of the media guide graphical user interface for display on a display screen of a display device, the providing of the on-now view of the media guide graphical user interface for display comprising determining, from a set of media guide data that represents a scheduled distribution of media programs by way of a media service, a subset of media guide data that represents only media programs within a set of media programs scheduled for distribution by way of the media service during one or more time slots that overlap a current time, selecting, based on one or more predefined media category selection factors including a media program factor, a subset of media categories for inclusion in the on-now view of the media guide graphical user interface, the subset of media categories dynamically and automatically selected from an overall set of predefined media categories by the media guide user interface system in response to the request for the on-now view of the media guide graphical user interface to be displayed by identifying fewer than all of the predefined media categories in the overall set, and prioritizing the identified fewer than all of the predefined media categories in the subset of media categories for display arrangement, selecting, from the media programs scheduled for distribution by way of the media service during the one or more time slots that overlap the current time, a category-specific set of media programs for inclusion in each media category included in the subset of media categories, populating the on-now view of the media guide graphical user interface with user interface content that represents the subset of media categories and the category-specific set of media programs selected for inclusion in each media category included in the subset of media categories, and providing the on-now view of the media guide graphical user interface for display on the display screen of the display device;

detecting, by the media guide user interface system, that a passage of time has caused the current time to move across a time slot boundary such that a new current time is not overlapped by the same one or more time slots that overlap the current time; and updating, by the media guide user interface system in response to the detecting that the passage of time has caused the current time to move across the time slot boundary, the on-now view of the media guide graphical user interface based on the new current time, the updating comprising preventing a removal, from the updated on-now view of the media guide graphical user interface, of at least one of a highlighted media category included in the subset of media categories and a highlighted media program included in the category-specific set of media programs.

13. The method of claim 12, embodied as computer-executable instructions on at least one non-transitory computer-readable medium.

14. A system comprising:
at least one physical computing device that:
detects a request for a media guide graphical user interface;
provides, in response to the request, the media guide graphical user interface for display on a display screen of a display device, the media guide graphical user interface comprising a menu of selectable menu options that include a first menu option selectable to access a first view of the media guide graphical user interface, the first view of the media guide graphical user interface dedicated to presenting information about media programs within a first set of media programs scheduled for distribution by way of a media service during one or more time slots that overlap a current time, the information about each of the media programs within the first set of media programs presented as an entry of at least one media category of a first subset of media categories included in the first view of the media guide graphical user interface, the first subset of media categories dynamically and automatically selected by the media guide user interface system from an overall set of predefined media categories by identifying fewer than all of the predefined media categories in the overall set based on one or more predefined media category selection factors when the first view of the media guide graphical user interface is accessed, and prioritizing the identified fewer than all of the predefined media categories in the first subset of media categories for display arrangement based on the one or more predefined media category selection factors, and a second menu option selectable to access a second view of the media guide graphical user interface, the second view of the media guide graphical user interface dedicated to presenting information about media programs within a second set of media programs scheduled for distribution by way of the media service during one or more time slots that are temporally subsequent to the one or more time slots that overlap the current time, the information about each of the media programs within the second set of media programs presented as an entry of at least one media category of a second subset of media categories included in the second view of the media guide graphical user interface, the second subset of media categories dynamically and automatically selected by the media guide user interface system from the overall set of predefined media categories by identifying fewer than all of the predefined media categories in the overall set based on the one or more predefined media category selection factors when the second view of the media guide graphical user interface is accessed, and prioritizing the identified fewer than all of the predefined media categories in the second subset of media categories for display arrangement based on the one or more predefined media category selection factors;

detects a user selection of the first menu option;
provides, in response to the detection of the user selection of the first menu option, the first view of the media guide graphical user interface for display on the display screen;
detects that a passage of time has caused the current time to move across a time slot boundary such that a new current time is not overlapped by the same one or more time slots that overlap the current time; and
updates, in response to the detection that the passage of time has caused the current time to move across the time slot boundary, the first view of the media guide graphical user interface based on the new current time, wherein the update prevents a removal, from the updated first view of the media guide graphical user interface, of at least one of a highlighted media category included in the subset of media categories and a highlighted media program included in the category-specific set of media programs.

15. The system of claim 14, wherein the menu of selectable options further includes:
   a third menu option selectable to access a third view of the media guide graphical user interface, the third view of the media guide graphical user interface dedicated to presenting information about portals for providers of media programs distributed by way of the media service; and
   a fourth menu option selectable to access a fourth view of the media guide graphical user interface, the fourth view of the media guide graphical user interface dedicated to presenting information about media programs in a matrix of cells positioned relative to a channel axis and a time axis.

16. The system of claim 14, wherein the menu of selectable options further includes a third menu option selectable to access a third view of the media guide graphical user interface, the third view of the media guide graphical user interface dedicated to presenting information about media programs within a third set of media programs scheduled for distribution by way of the media service during one or more time slots that temporally precede the one or more time slots that overlap the current time.

17. The system of claim 14, wherein the at least one physical computing device further:
   detects, while the first view of the media guide graphical user interface is displayed on the display screen, a user selection of the second menu option; and
   provides, in response to the detecting of the user selection of the second menu option, the second view of the media guide graphical user interface for display on the display screen, the display of the second view of the media guide graphical user interface replacing the display of the first view of the media guide graphical user interface on the display screen.

18. The system of claim 14, wherein the at least one physical computing device provides the first view of the media guide graphical user interface for display on the display screen by
   determining, from a set of media guide data that represents a scheduled distribution of media programs by way of a media service, a subset of media guide data that represents only media programs scheduled for distribution by way of the media service during the one or more time slots that overlap the current time,
   dynamically and automatically selecting, based on the one or more predefined media category selection factors, the first subset of media categories for inclusion in the first view of the media guide graphical user interface,
   selecting, from the media programs within the first set of media programs scheduled for distribution by way of the media service during the one or more time slots that overlap the current time, a category-specific set of media programs for inclusion in each media category included in the first subset of media categories,
   populating the first view of the media guide graphical user interface with user interface content that represents the first subset of media categories and the category-specific set of media programs selected for inclusion in each media category included in the first subset of media categories, and
   providing the populated first view of the media guide graphical user interface for display on the display screen of the display device.

19. The system of claim 18, wherein the dynamic and automatic selecting of the first subset of media categories for inclusion in the first view of the media guide graphical user interface comprises identifying the fewer than all of the predefined media categories included in the first subset of media categories and prioritizing the identified fewer than all of the predefined media categories included in the first subset of media categories for display arrangement based on the one or more predefined media category selection factors.

20. The system of claim 14, wherein the one or more predefined media category selection factors comprise at least one of a time factor, a media program factor, an end-user factor, and a user community factor.

* * * * *